United States Patent
Newman et al.

(10) Patent No.: US 11,794,328 B2
(45) Date of Patent: *Oct. 24, 2023

(54) ANGULARLY ADJUSTABLE TOOL CONNECTION HAVING THREADED CONNECTOR AND CLAMP-TYPE CONNECTOR

(71) Applicant: Specialty Products of Greenwood, Missouri, Inc., Greenwood, MO (US)

(72) Inventors: Robert Caleb Sterling Newman, Lee's Summit, MO (US); Melodie Lea Wendleton, Lee's Summit, MO (US); B. Deré Newman, Lone Jack, MO (US); Marco Carroll Perry, Brooklyn, NY (US); Mark David Prommel, Brooklyn, NY (US); Curtis Barbre, Brooklyn, NY (US); Kevin Min O'Leary, Brooklyn, NY (US)

(73) Assignee: Specialty Products of Greenwood, Missouri, Inc., Greenwood, MO (US)

( * ) Notice: Subject to any disclaimer, the term of this patent is extended or adjusted under 35 U.S.C. 154(b) by 35 days.

This patent is subject to a terminal disclaimer.

(21) Appl. No.: 17/514,870

(22) Filed: Oct. 29, 2021

(65) Prior Publication Data

US 2022/0048180 A1 Feb. 17, 2022

Related U.S. Application Data

(63) Continuation of application No. 15/818,183, filed on Nov. 20, 2017, now Pat. No. 11,179,842.

(Continued)

(51) Int. Cl.
*B25G 1/04* (2006.01)
*B25G 1/06* (2006.01)

(Continued)

(52) U.S. Cl.
CPC .............. *B25G 1/04* (2013.01); *A46B 5/0075* (2013.01); *A46B 5/0083* (2013.01); *A46B 17/02* (2013.01);

(Continued)

(58) Field of Classification Search
CPC .......... Y10T 16/473; B25G 1/04; B25G 3/38; B25G 3/20; B25G 3/24; B25G 3/18;

(Continued)

(56) References Cited

U.S. PATENT DOCUMENTS 503,888 A * 8/1893 Wiebush .................. A47L 1/06
15/153
590,751 A * 9/1897 Clarke et al. ......... F16B 5/0233
403/33

(Continued)

*Primary Examiner* — Tyrone V Hall, Jr.
*Assistant Examiner* — Makena S Markman
(74) *Attorney, Agent, or Firm* — Hovey Williams LLP

(57) ABSTRACT

An adjustable tool holder is configured for interchangeable use with a variety of tools provided with different connection elements. The connection elements include at least a first connection element configured for a first manner of connection with the tool holder and a second connection element configured for a second manner of connection with the tool holder. The tool holder includes a distally extending tool support operable to detachably support each of the tools. The tool support includes a first tool connector configured to releasably connect with the first connection element in the first manner of connection. The tool support includes a second tool connector configured to releasably connect with the second connection element in the second manner of connection.

21 Claims, 29 Drawing Sheets

Related U.S. Application Data

(60) Provisional application No. 62/424,211, filed on Nov. 18, 2016.

(51) Int. Cl.
  *B25G 3/24* (2006.01)
  *A46B 17/02* (2006.01)
  *A46B 5/00* (2006.01)
  *B25G 3/26* (2006.01)
  *F16B 2/06* (2006.01)

(52) U.S. Cl.
  CPC .............. *B25G 1/06* (2013.01); *B25G 3/24* (2013.01); *B25G 3/26* (2013.01); *A46B 2200/20* (2013.01); *A46B 2200/202* (2013.01); *F16B 2/06* (2013.01)

(58) Field of Classification Search
  CPC .... B25G 3/26; B25G 3/28; B25G 3/30; A46B 17/02; A46B 5/0075; A46B 5/0083; A46B 2200/202; A46B 2200/20; B05C 17/0205; B25F 1/04
  USPC .............................. 15/144.1, 144.4, 145, 146
  See application file for complete search history.

(56) References Cited

U.S. PATENT DOCUMENTS

| | | | |
|---|---|---|---|
| 8,533,890 B2* | 9/2013 | Pannell | A47L 13/022 16/427 |
| 10,188,258 B2* | 1/2019 | Deveau | A46B 9/06 |

* cited by examiner

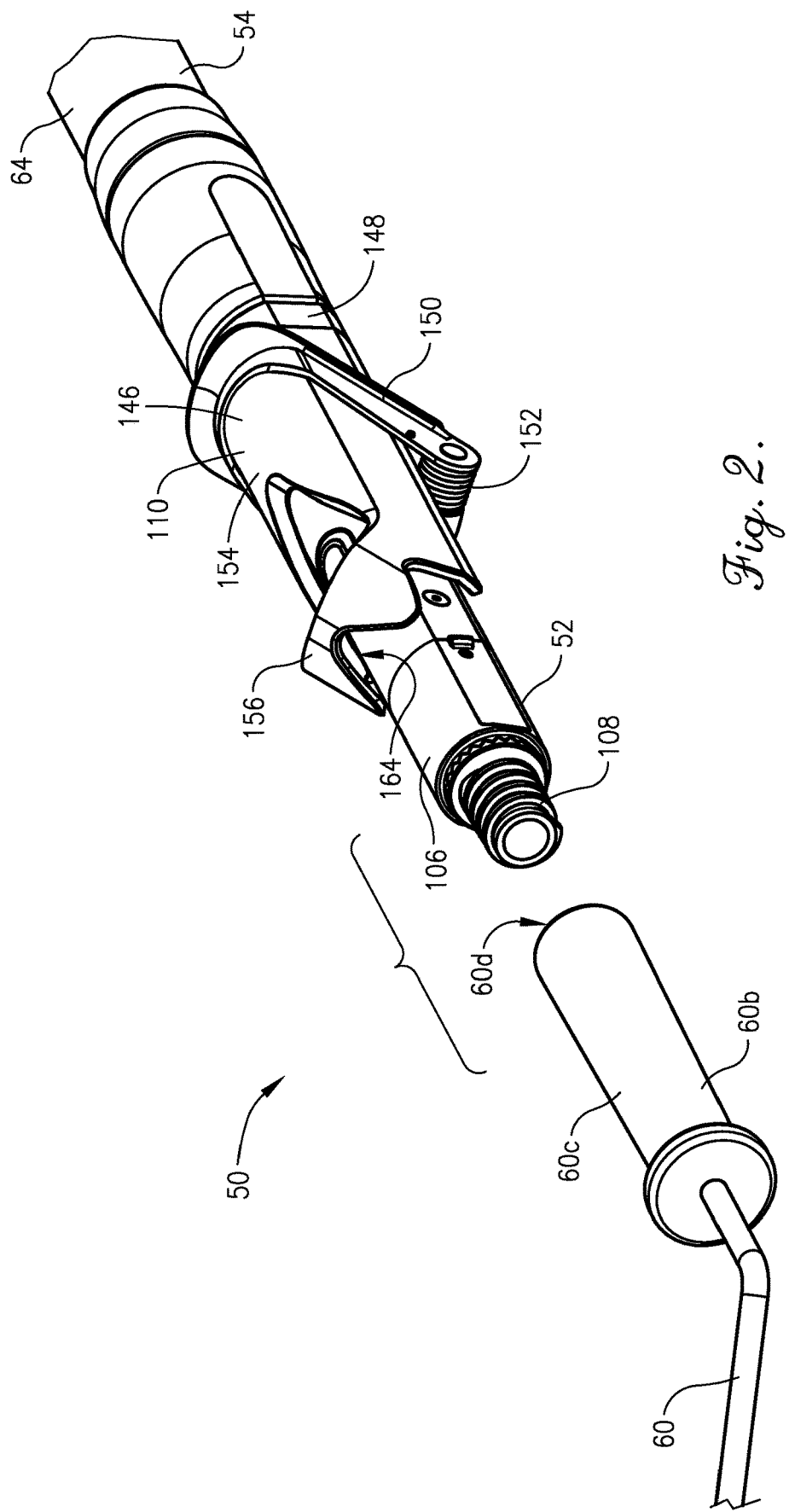

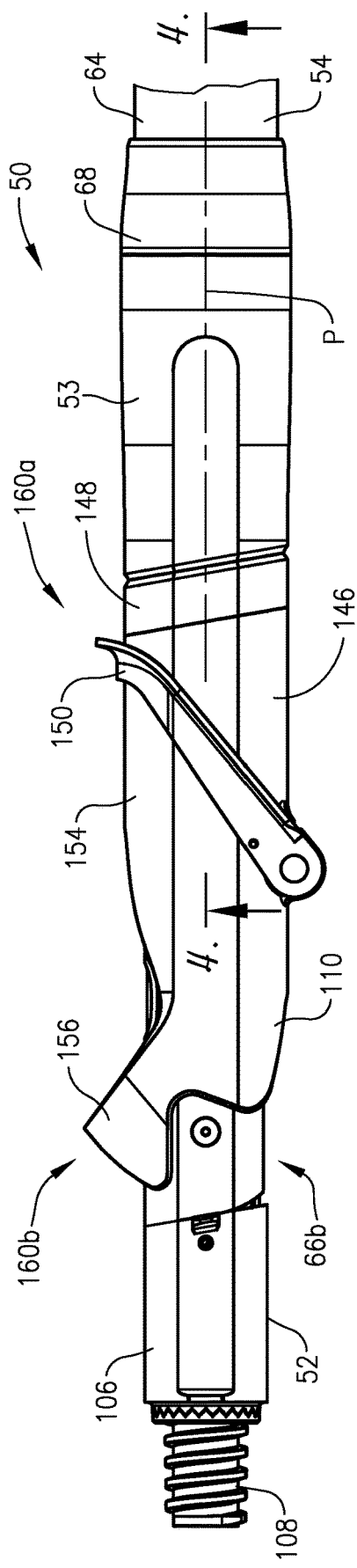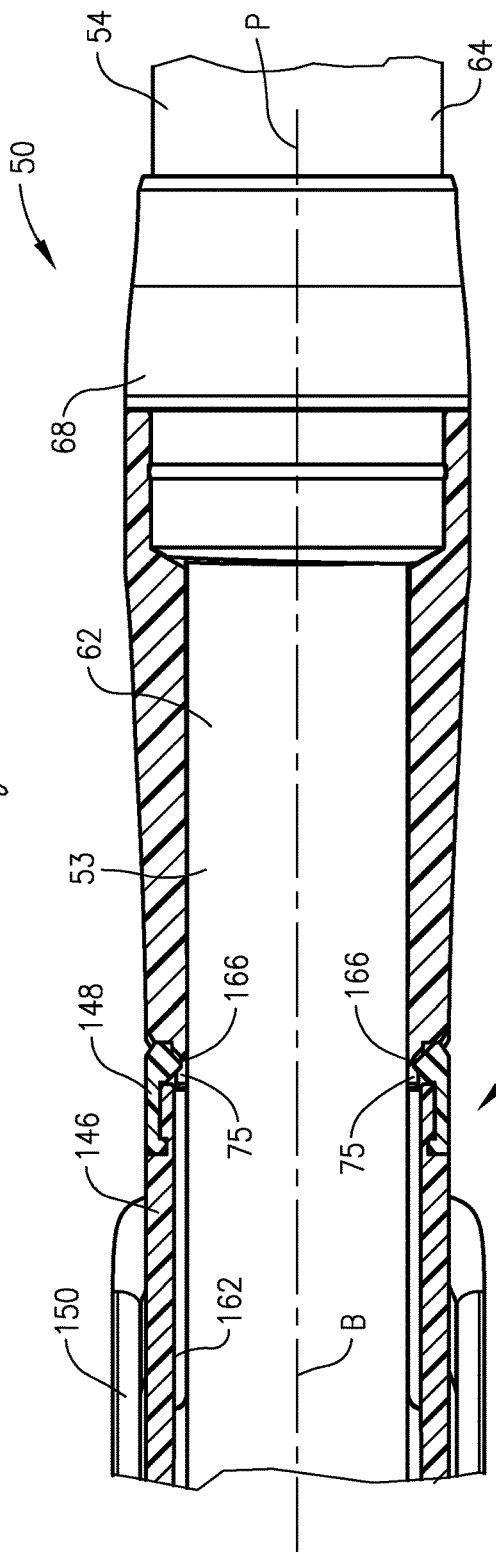

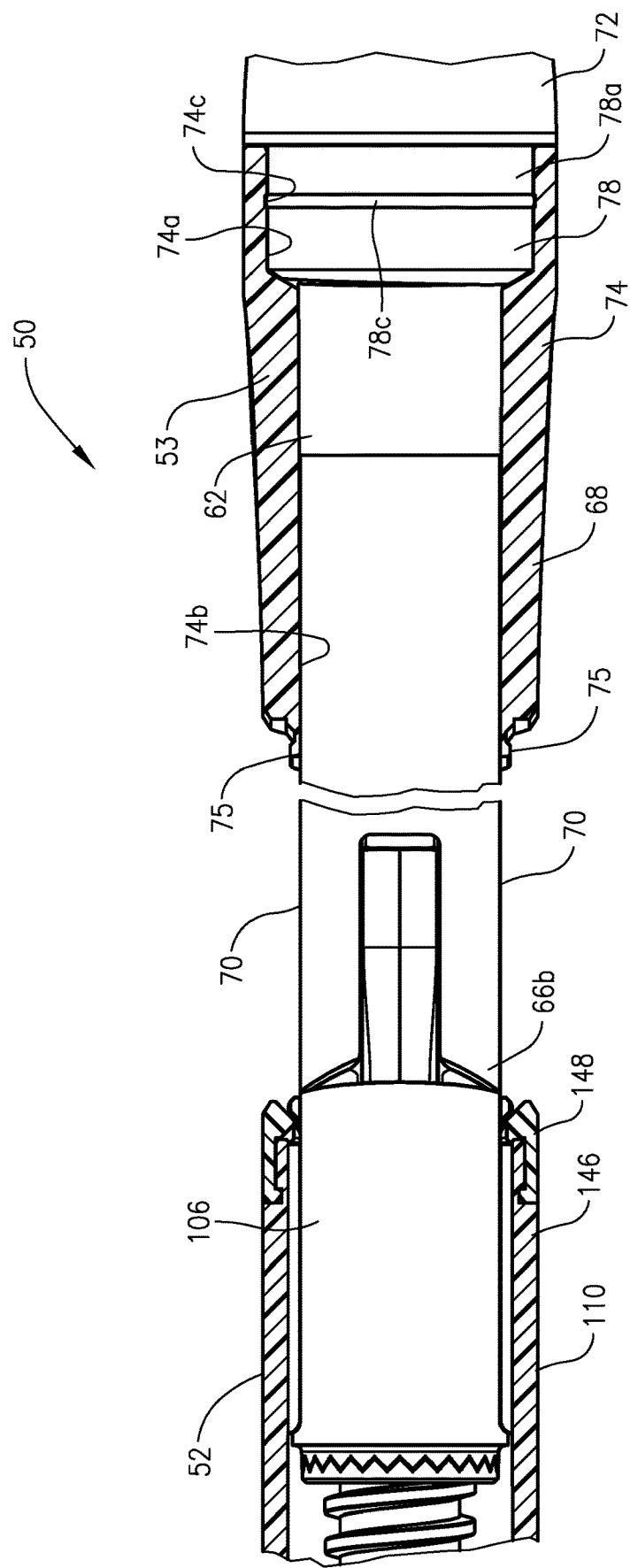

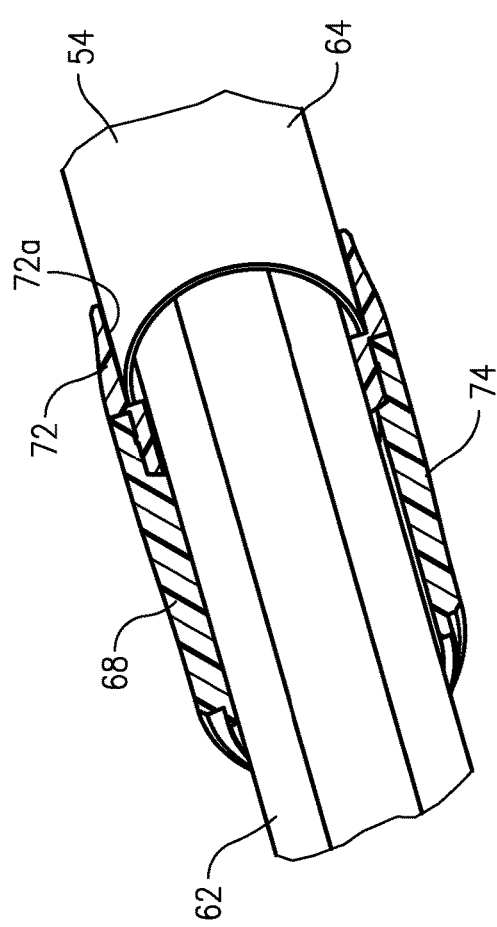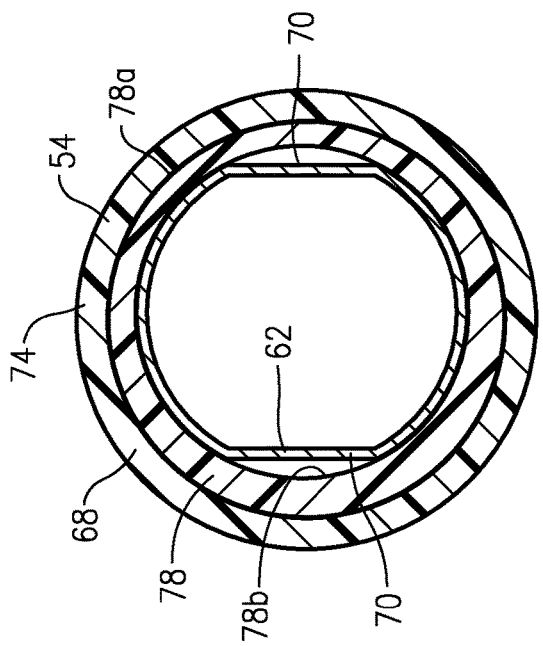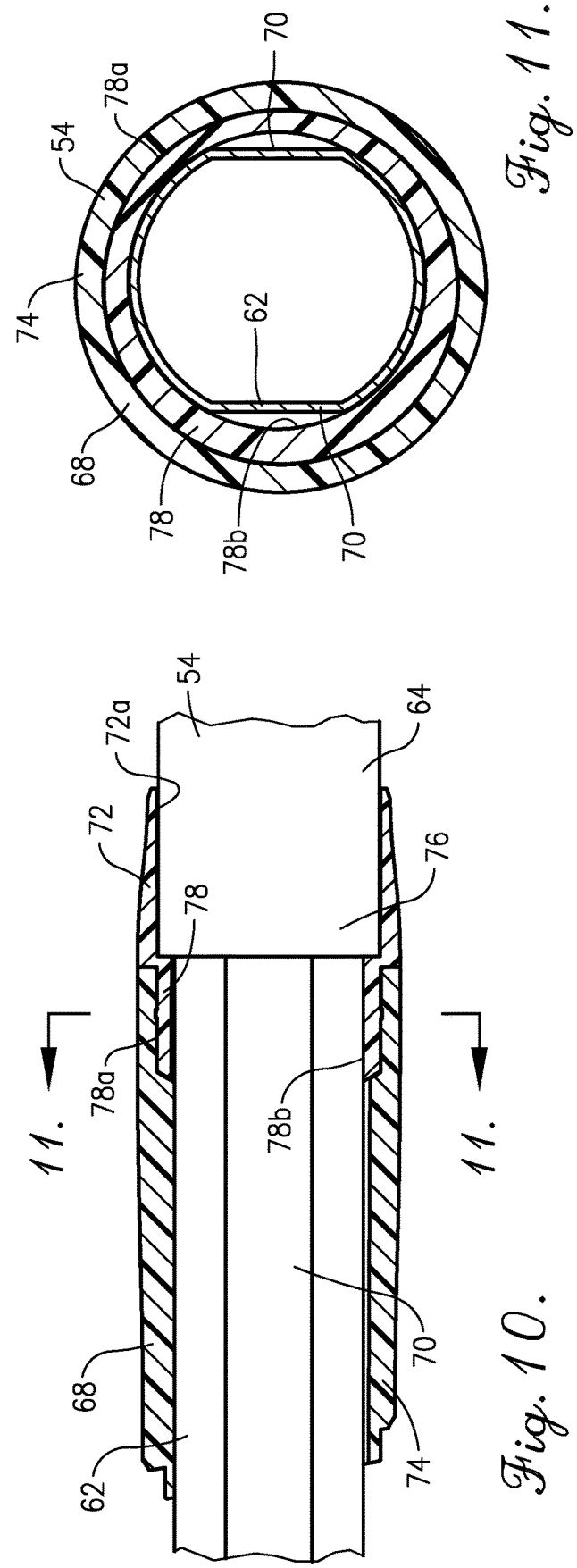

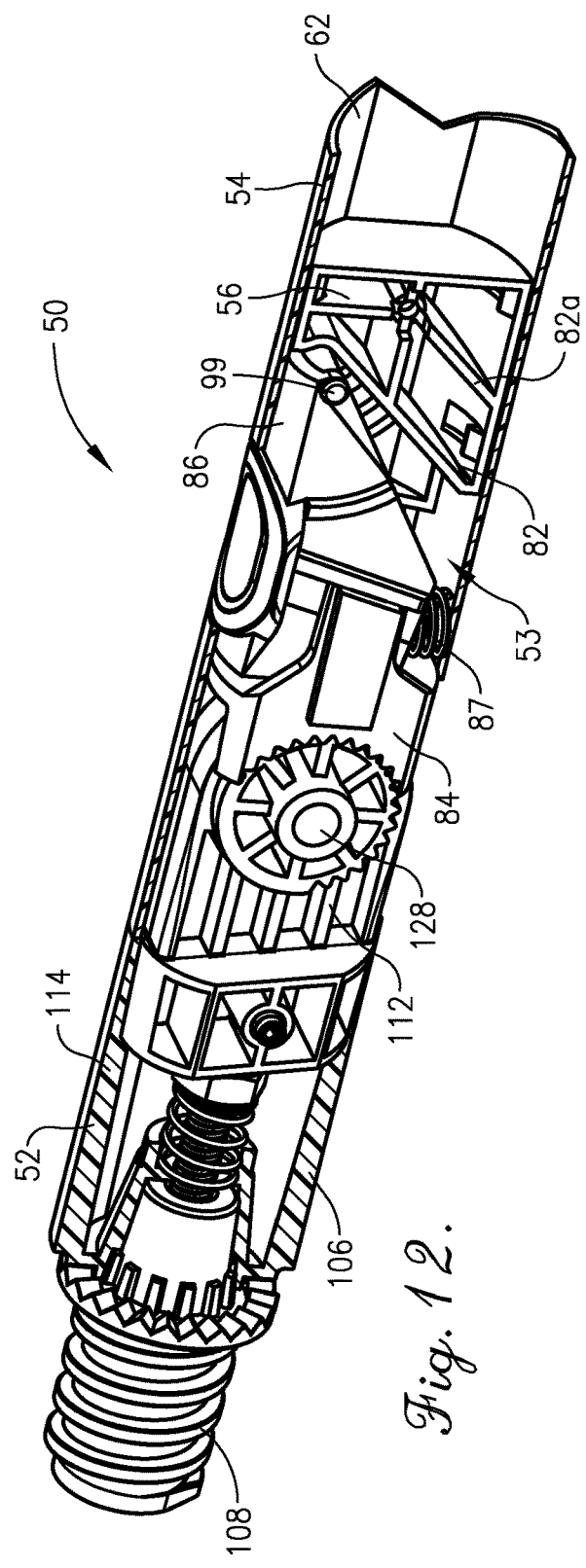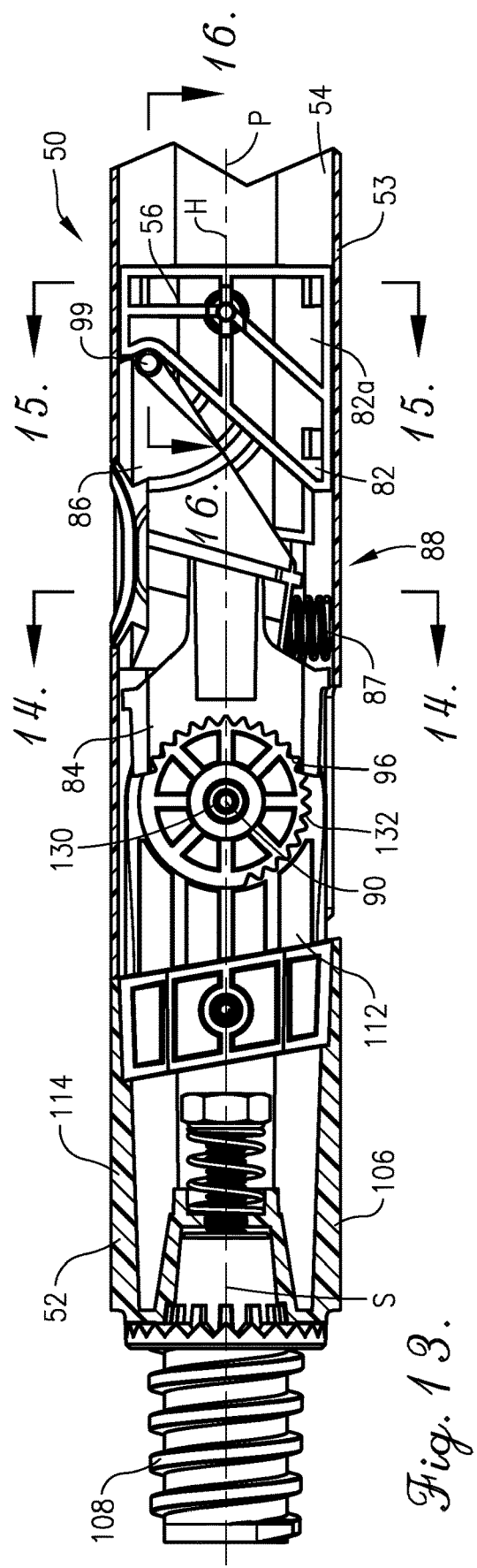

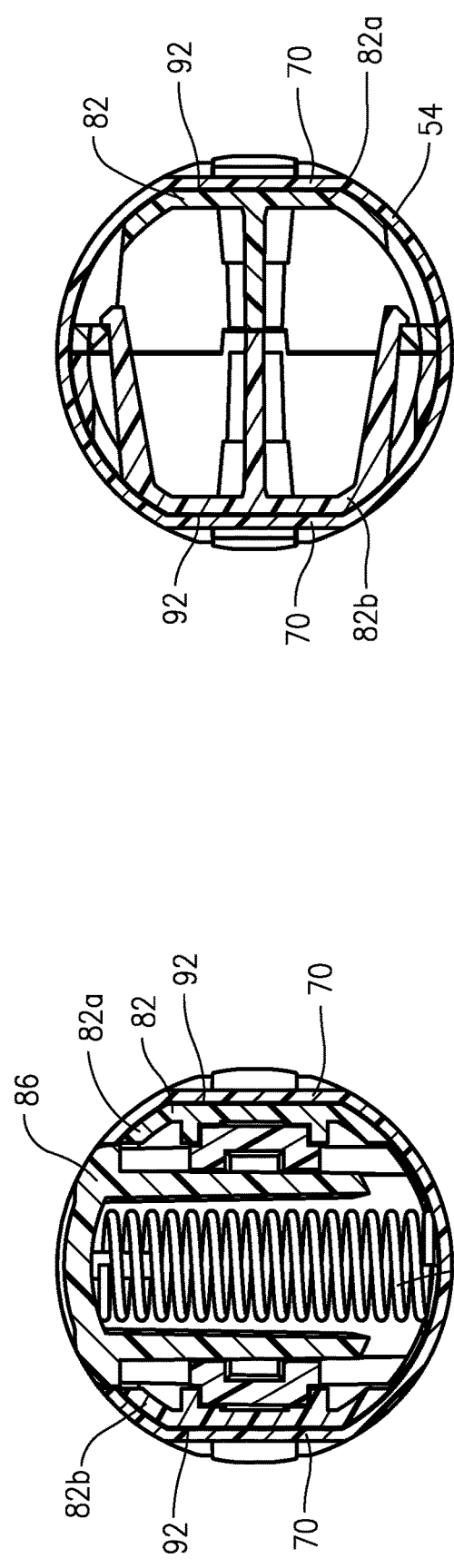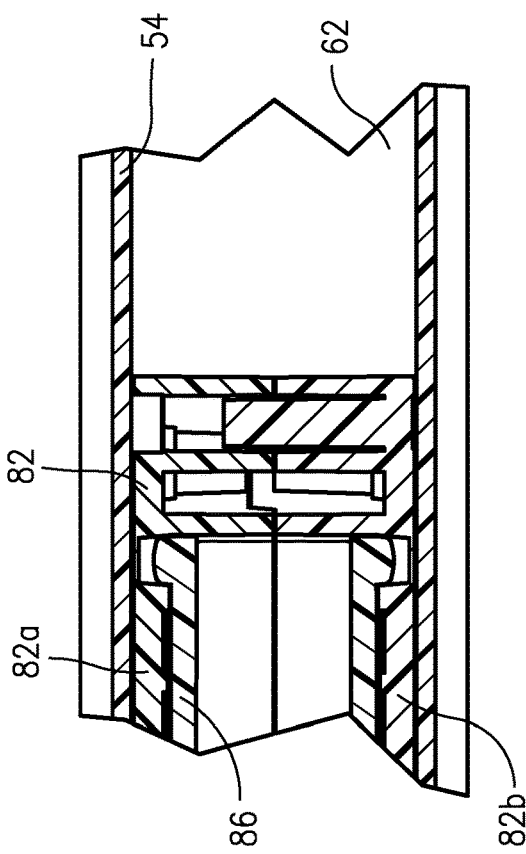

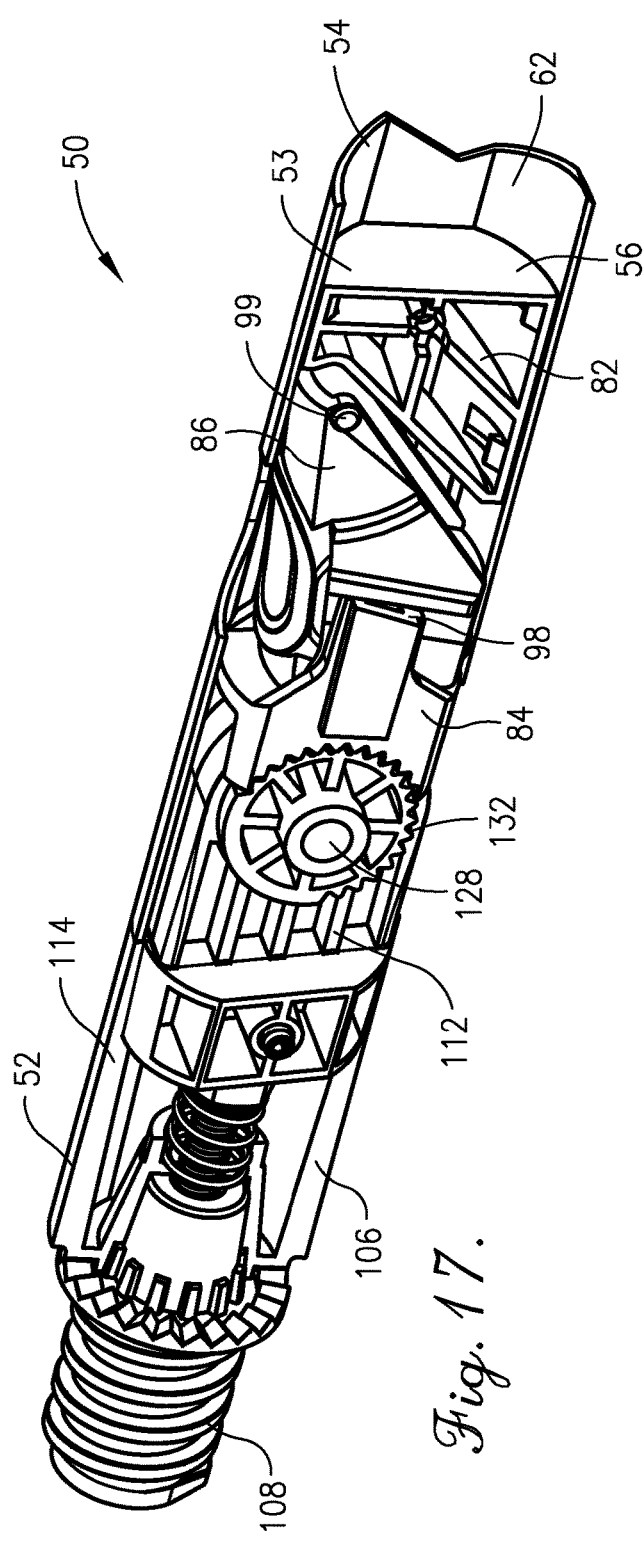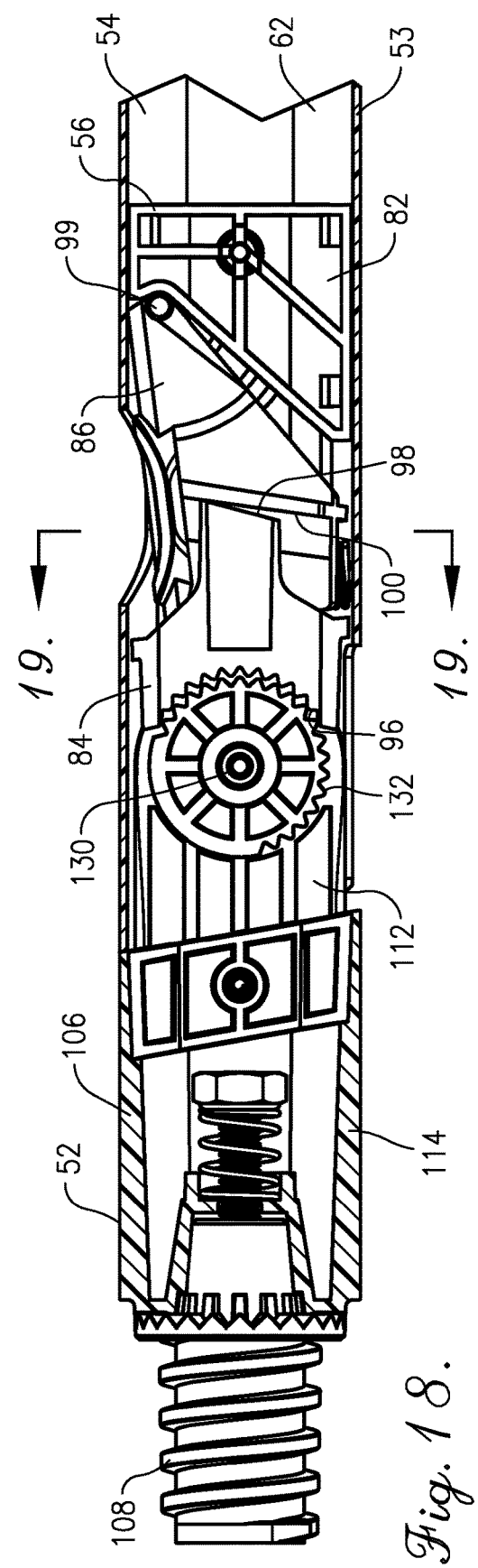

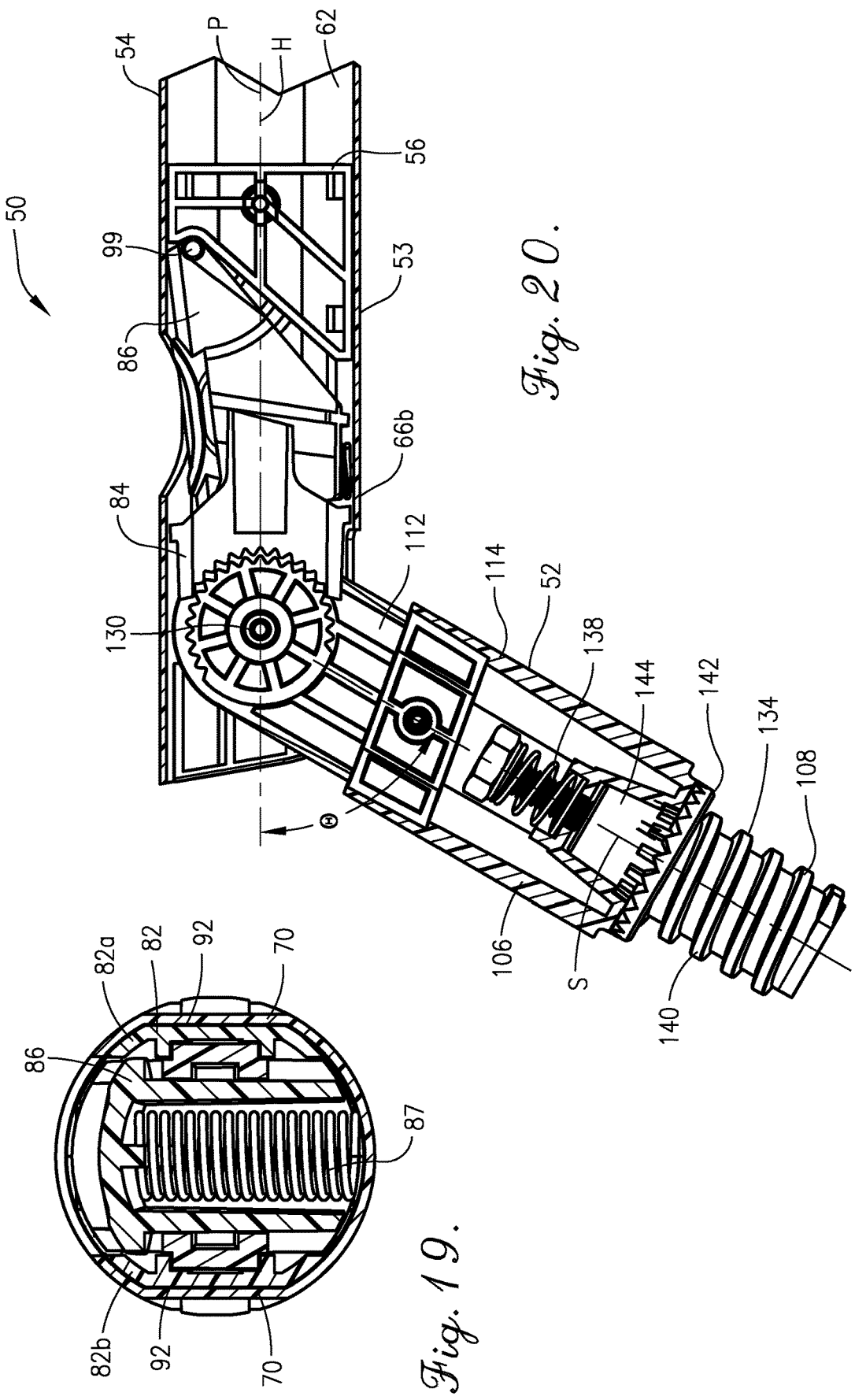

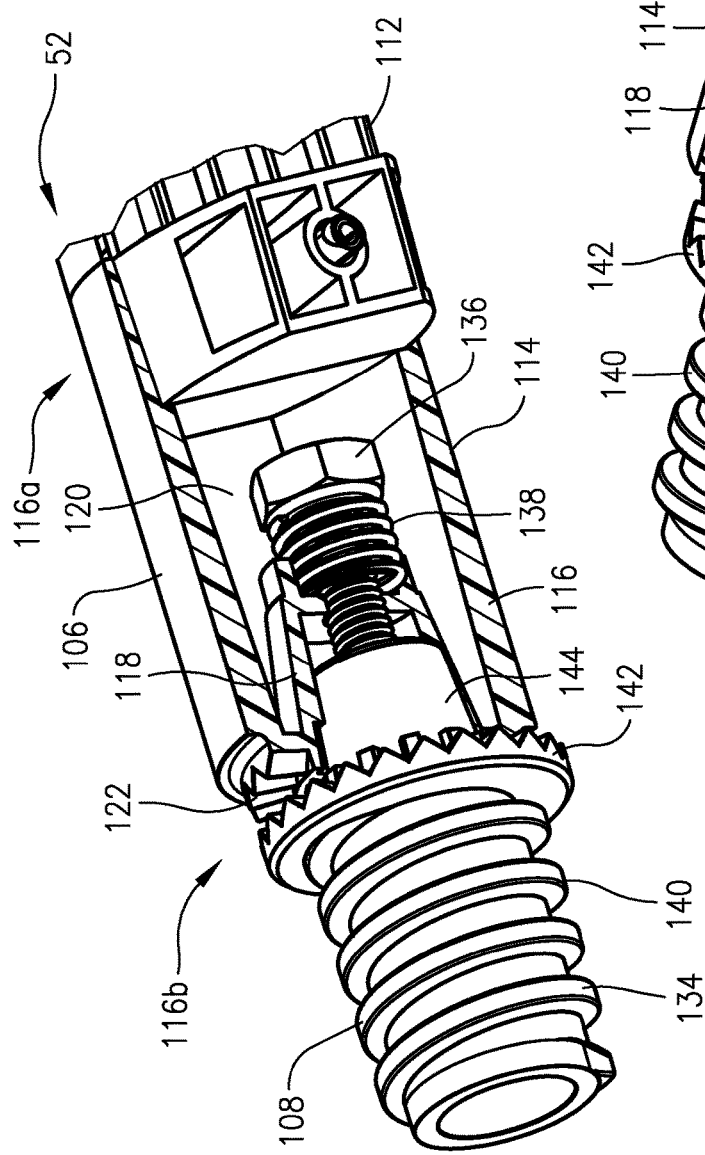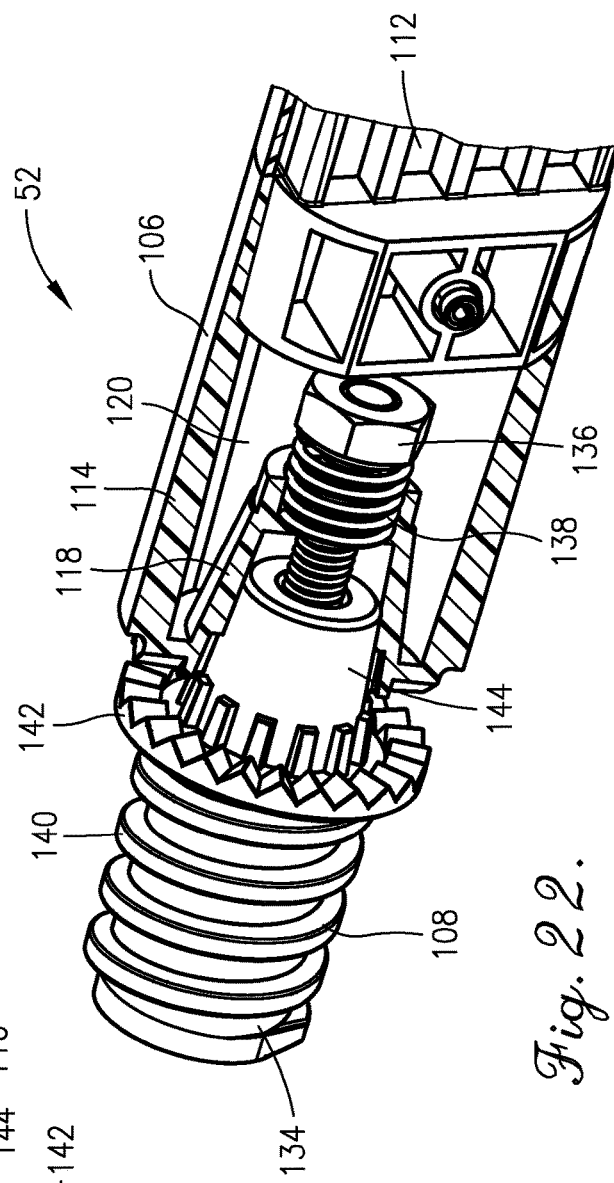

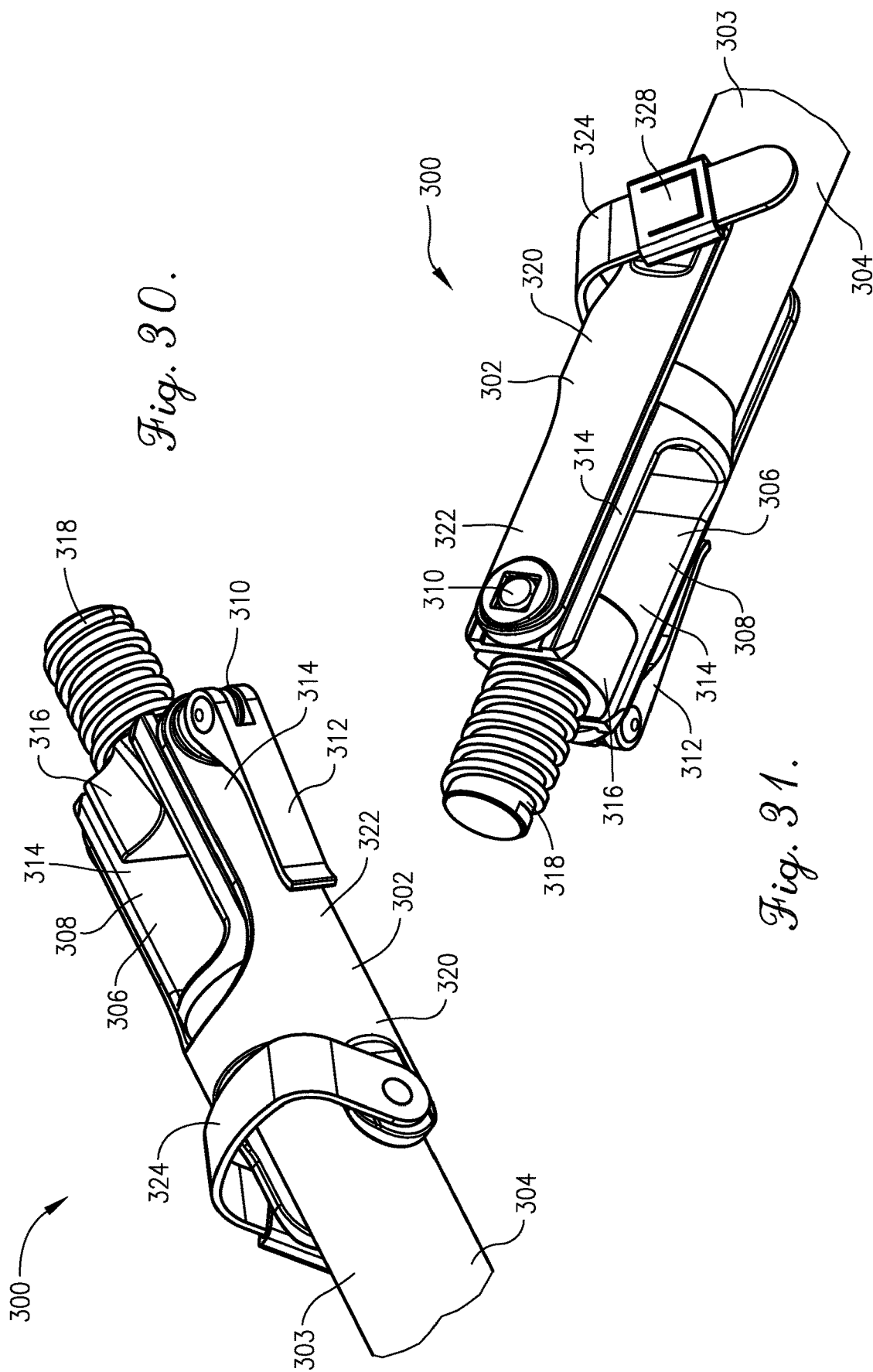

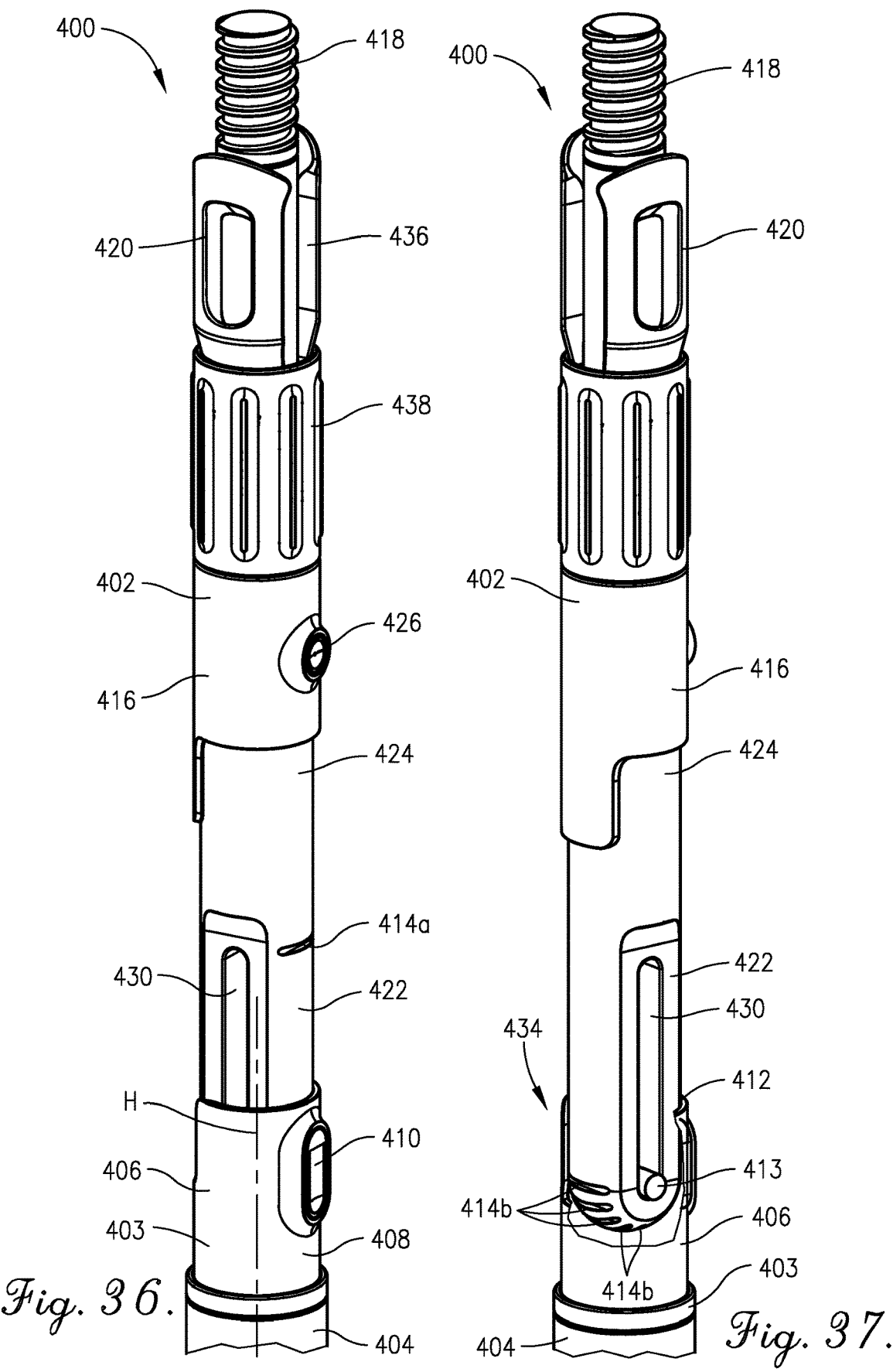

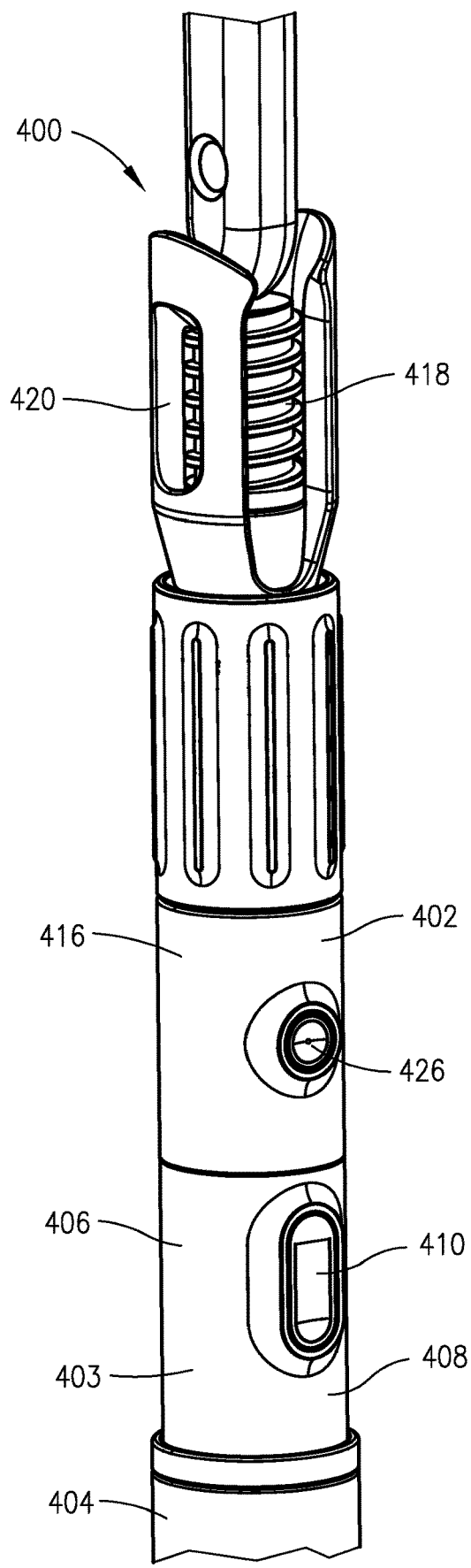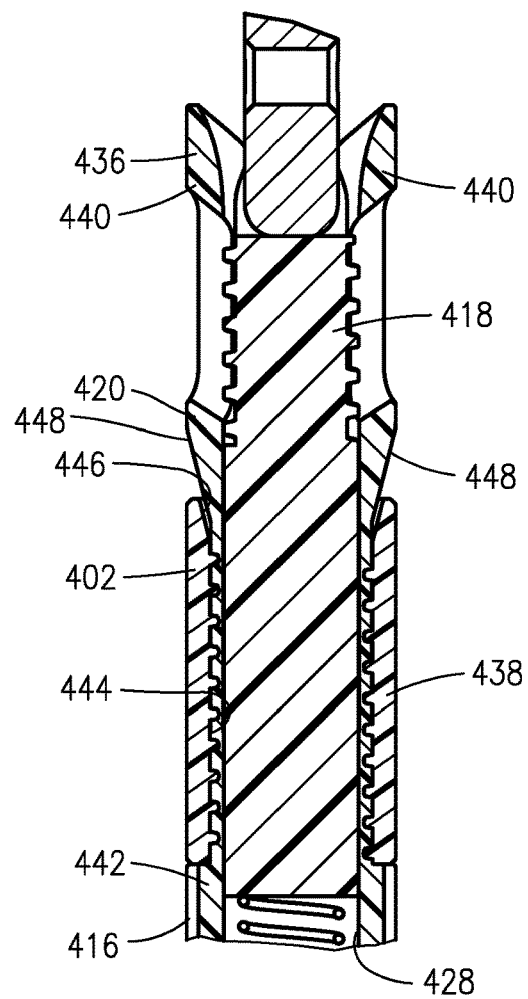
Fig. 38.
Fig. 39.

ANGULARLY ADJUSTABLE TOOL CONNECTION HAVING THREADED CONNECTOR AND CLAMP-TYPE CONNECTOR

RELATED APPLICATION

This is a continuation of prior application Ser. No. 15/818,183, filed Nov. 20, 2017, entitled ANGULARLY ADJUSTABLE TOOL CONNECTION HAVING THREADED CONNECTOR AND CLAMP-TYPE CONNECTOR, which claims the benefit of U.S. Provisional Application Ser. No. 62/424,211, filed Nov. 18, 2016, entitled ANGULARLY ADJUSTABLE TOOL CONNECTION HAVING THREADED CONNECTOR AND CLAMP-TYPE CONNECTOR, each of which is hereby incorporated in its entirety by reference herein.

BACKGROUND

1. Field

The present invention relates generally to manually operated tools with handles. More specifically, embodiments of the present invention concern a tool holder for interchangeable use with a variety of tools.

2. Discussion of Prior Art

Extension poles have long been used to support various types of manually operated tools, such as paint brushes, for applications where an extended reach is needed. Known extension poles include fixed-length poles and adjustable-length poles (such as telescopic extension poles). Conventional extension poles typically include a distal connector located at the distal end of the pole for removable attachment to the desired tool (such as a paint brush). Connectors used with prior art extension poles include threaded connectors and frictional connectors.

Prior art extension poles and extension pole accessories have various deficiencies. For instance, the threaded connector or frictional connector of a conventional extension pole is not readily connectable to the wide range of available manual tools. Known extension pole adaptors are available to change the type of connector associated with an extension pole. However, extension pole adaptors are difficult to use and provide an unreliable connection. The size of such adaptors also makes them easy to misplace or lose.

SUMMARY

The following brief summary is provided to indicate the nature of the subject matter disclosed herein. While certain aspects of the present invention are described below, the summary is not intended to limit the scope of the present invention.

Embodiments of the present invention provide a tool holder that does not suffer from the problems and limitations of the prior art extension poles and accessories set forth above.

A first aspect of the present invention concerns an adjustable tool holder for interchangeable use with a variety of tools provided with different connection elements. The connection elements include at least a first connection element configured for a first manner of connection with the tool holder and a second connection element configured for a second manner of connection with the tool holder. The tool holder broadly includes a distally extending tool support operable to detachably support each of the tools. The tool support includes a first tool connector configured to releasably connect with the first connection element in the first manner of connection. The tool support includes a second tool connector configured to releasably connect with the second connection element in the second manner of connection. The tool connectors are shiftable relative to one another so as to be alternatively located distally to facilitate connection to the respective connection element.

A second aspect of the present invention concerns an adjustable tool holder for interchangeable use with a variety tools provided with different connection elements. The connection elements include at least a first connection element configured for a first manner of connection with the tool holder and a second connection element configured for a second manner of connection with the tool holder. The tool holder broadly includes a proximal body and a distally extending tool support. The tool support is operable to detachably support each of the tools. The tool support includes a first tool connector configured to releasably connect with the first connection element in the first manner of connection. The tool support includes a second tool connector configured to releasably connect with the second connection element in the second manner of connection. The tool support is pivotally coupled to the proximal body so that the tool connectors are swingable relative to the proximal body.

A third aspect of the present invention concerns a method of interchangeably using a tool holder with a variety of tools. Each of the tools is connectable to the tool holder in a different manner. The method includes the steps of releasably connecting a first one of the tools to a first tool connector of the tool holder; disconnecting the first tool from the first tool connector; shifting a second tool connector of the tool holder and the first tool connector relative to one another so as to distally alternate the relative positions of the tool connectors; and releasably connecting a second one of the tools to the second tool connector, with the manner in which the second tool connector connects to the second tool being different than the manner in which the first tool connector connects to the first tool.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 2 is a fragmentary perspective of the tool holder and roller brush shown in FIG. 1, showing a tool support and proximal body of the tool holder, with the tool support including a support body, a threaded connector, and a clamp connector;

FIG. 3 is a fragmentary side elevation of the tool holder shown in FIGS. 1 and 2, showing the clamp connector in a retracted position, with the threaded connector being located distally of the clamp connector;

FIG. 4 is a fragmentary cross section of the tool holder taken along line 4-4 in FIG. 3;

FIG. 8 is a fragmentary cross section of the tool holder taken along line 8-8 in FIG. 7;

FIG. 9 is a fragmentary perspective of the tool holder shown in FIGS. 1-8, showing inner and outer pole sections of the extension pole interconnected by a cam mechanism, with the cam mechanism including proximal and distal sleeves rotatably engaged with one another;

FIG. 10 is a fragmentary side elevation of extension pole as depicted in FIG. 9;

FIG. 11 is a cross section of the extension pole taken along line 11-11 in FIG. 10;

Figure 23:
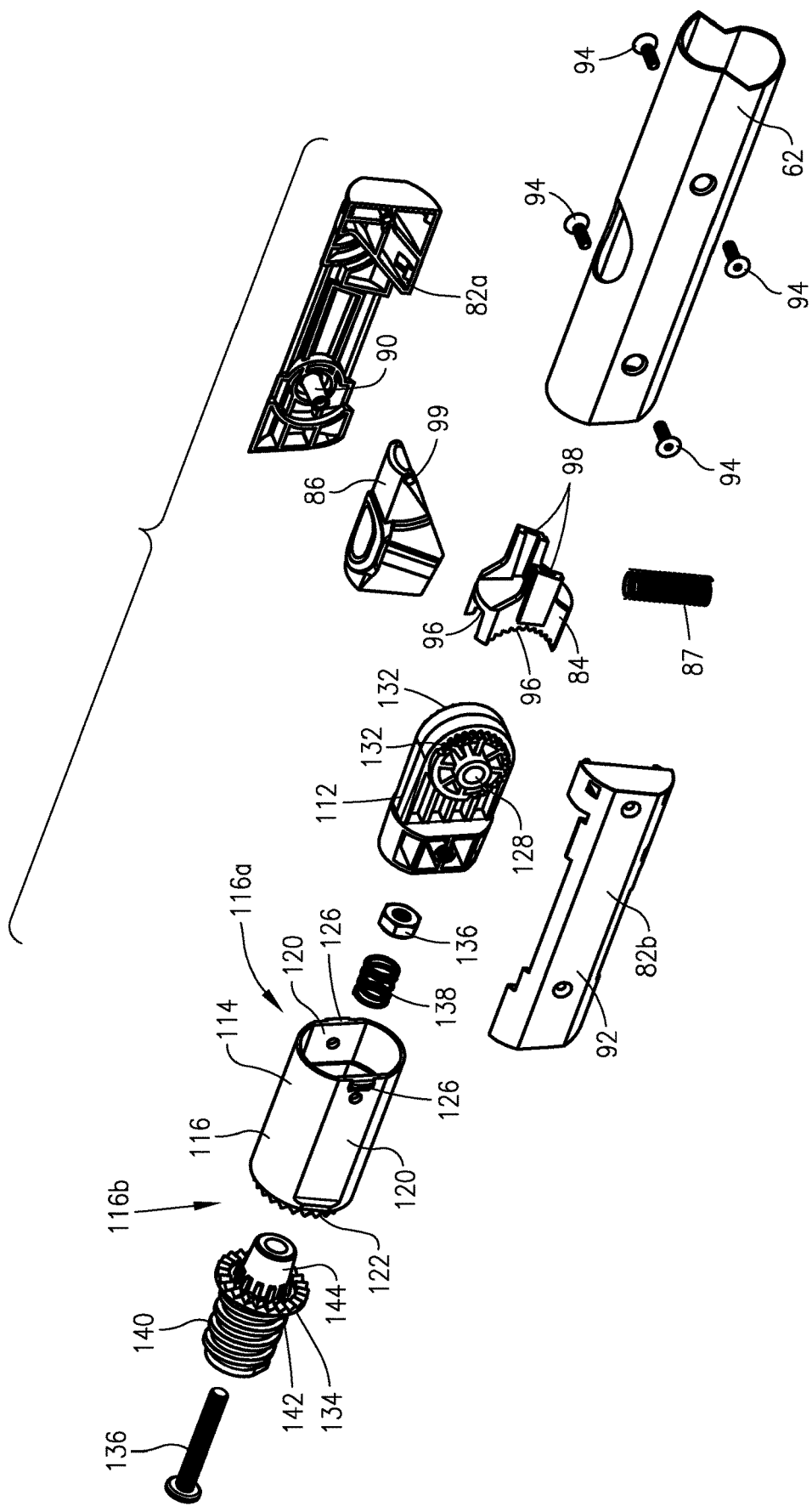
Figure 24:
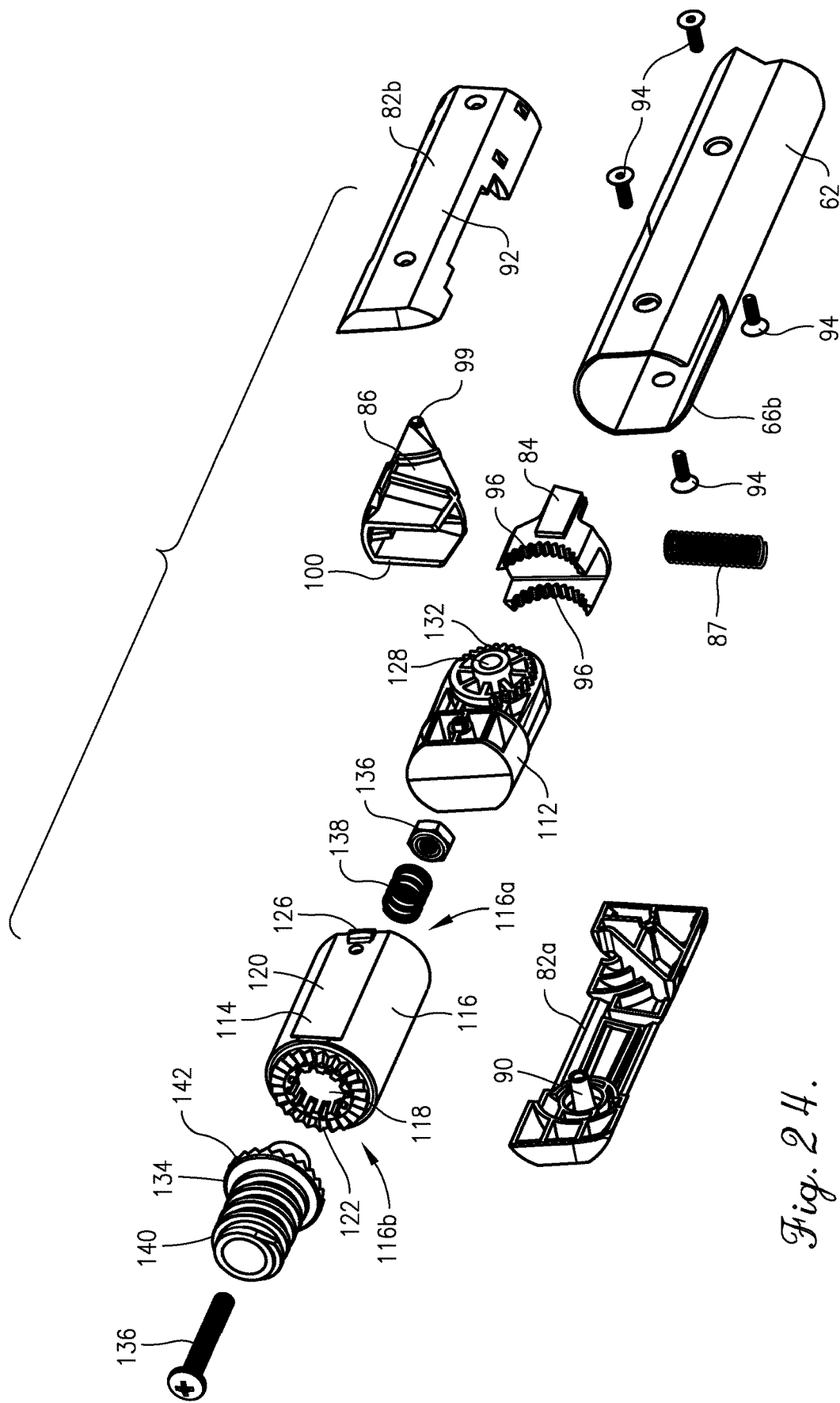
Figure 25:
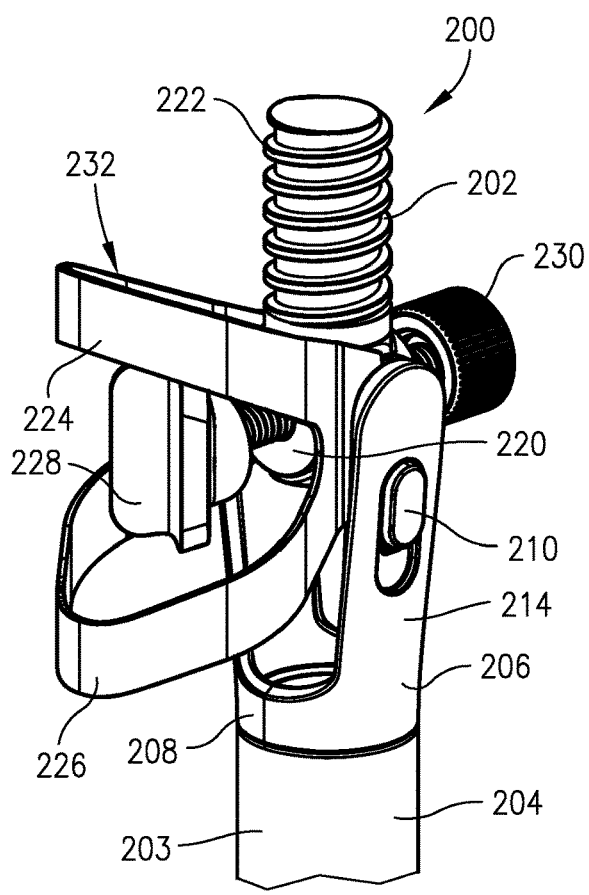
Figure 26:
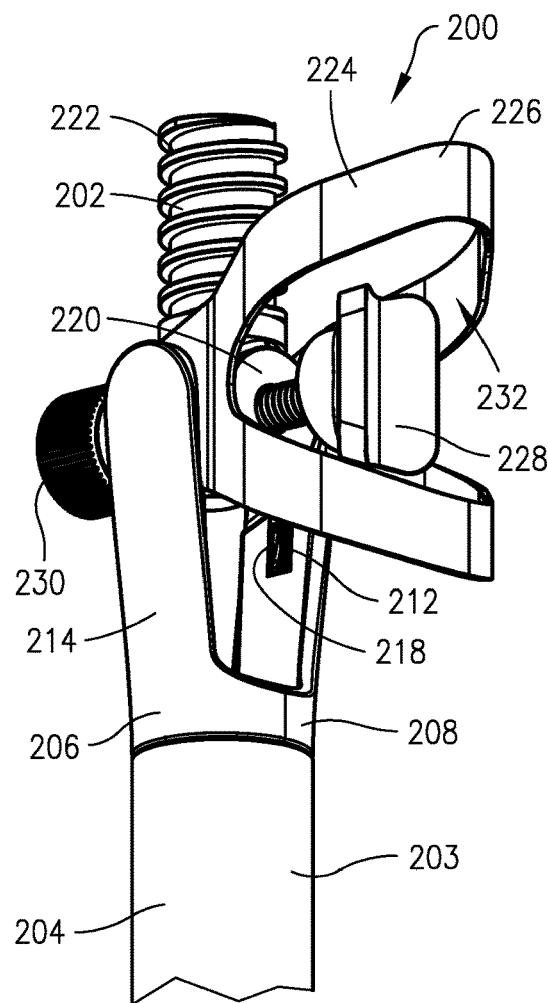
Figure 27:
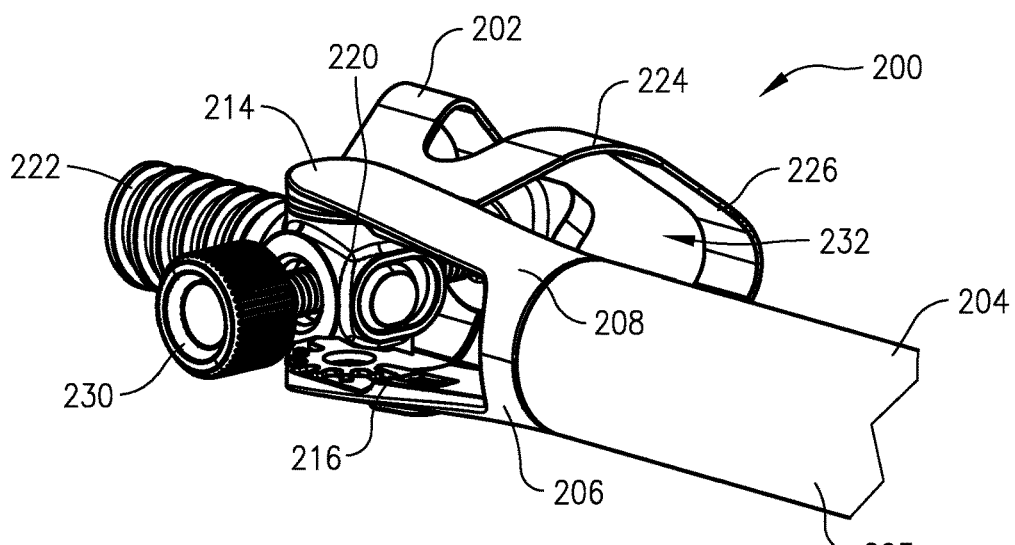
Figure 28:
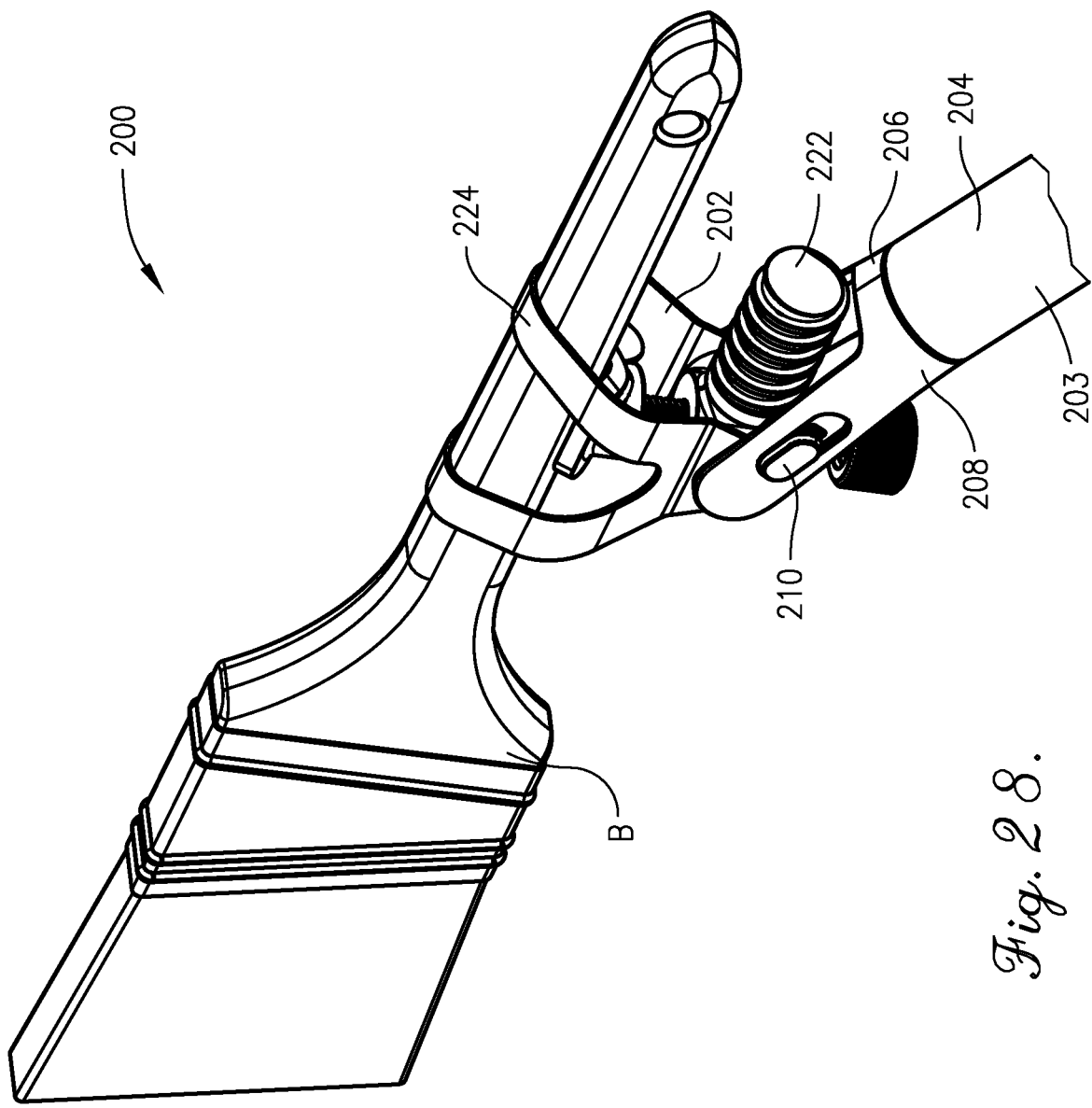
Figure 29:
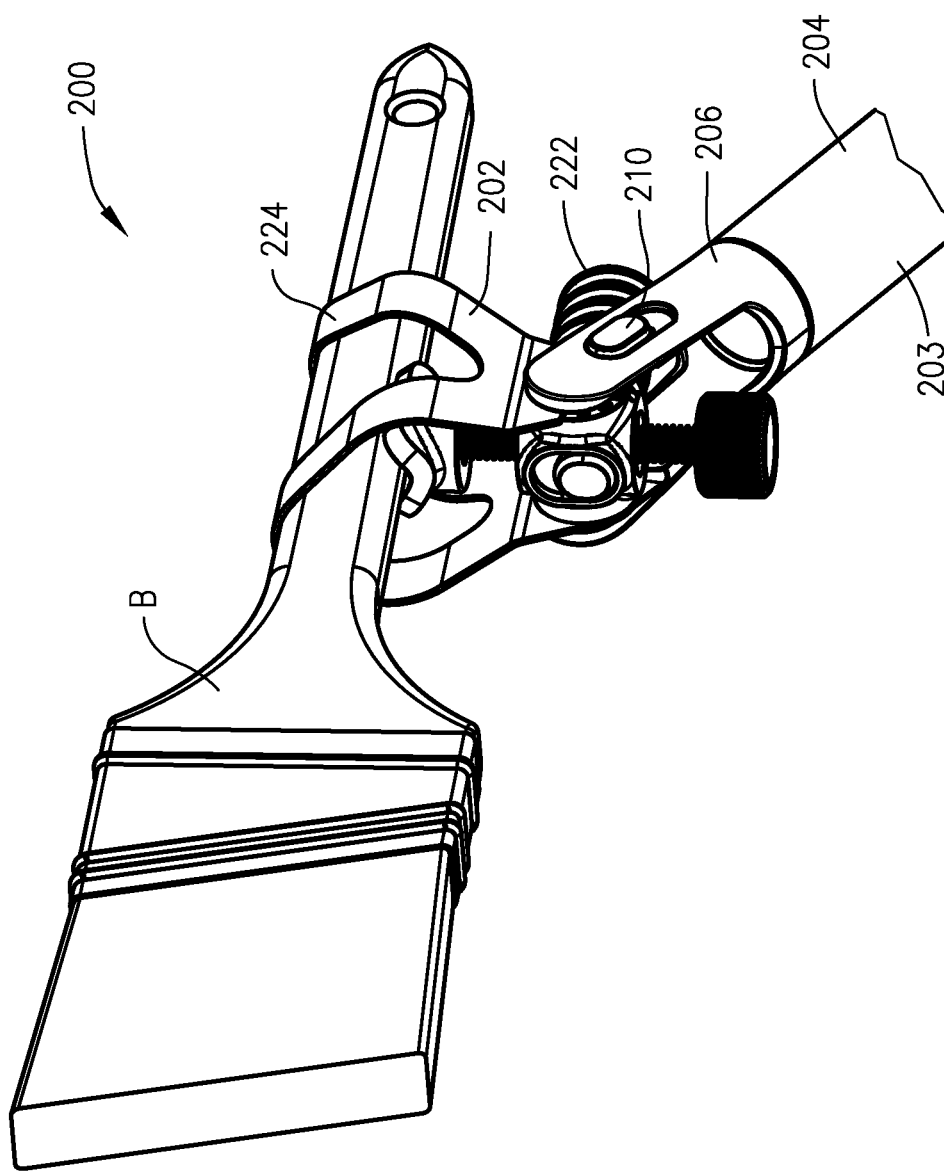
Figure 32:
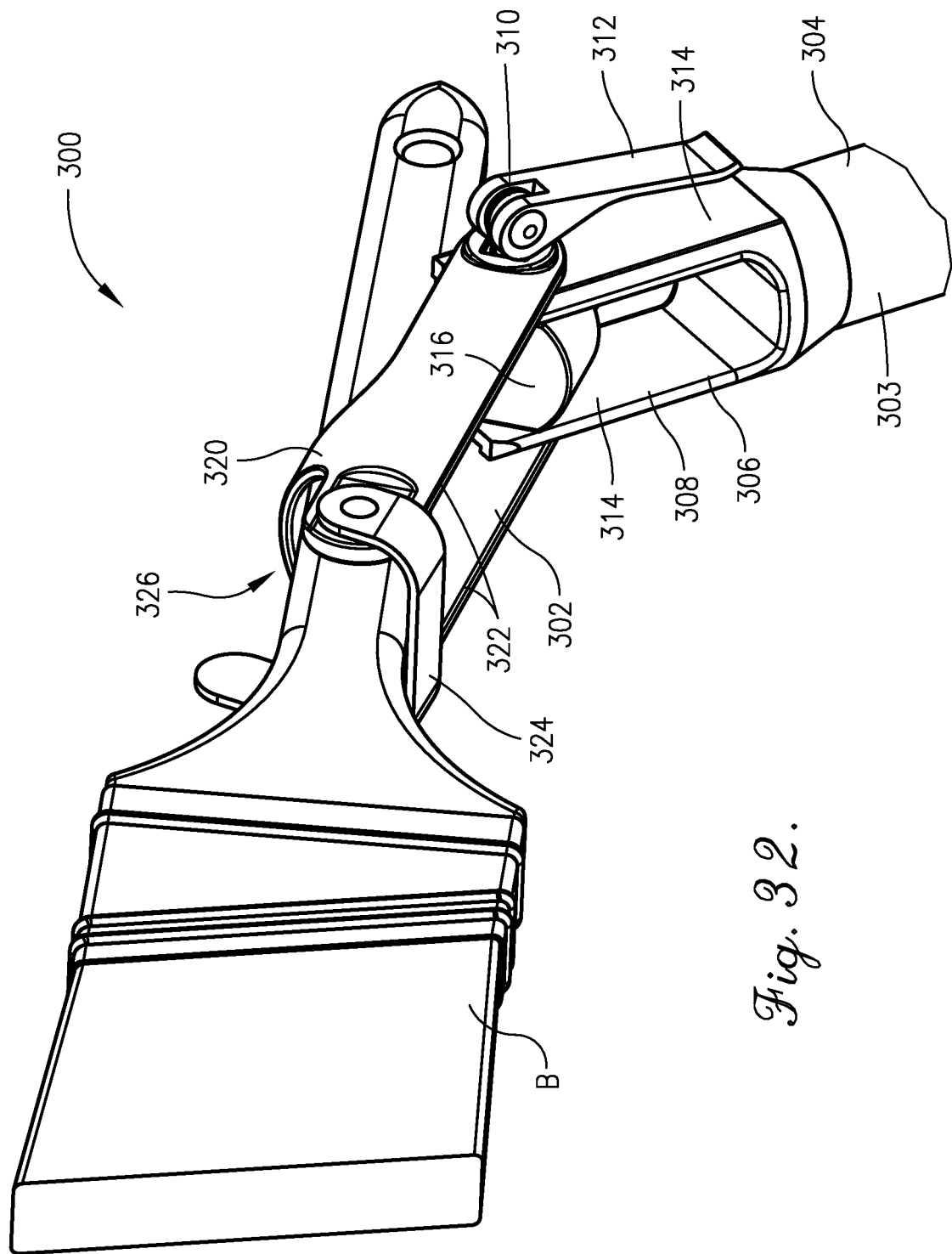
Figure 33:
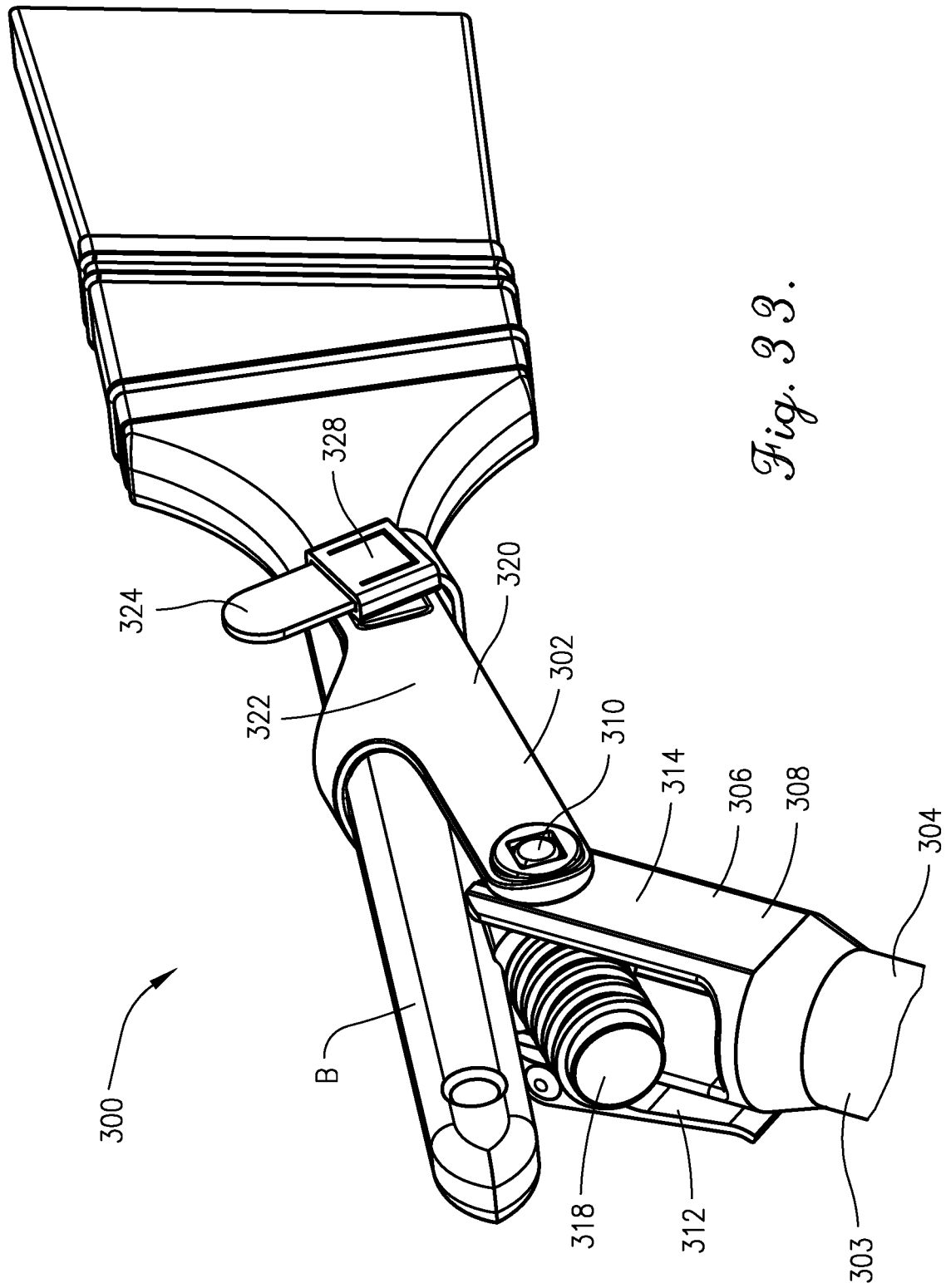
Figure 34:
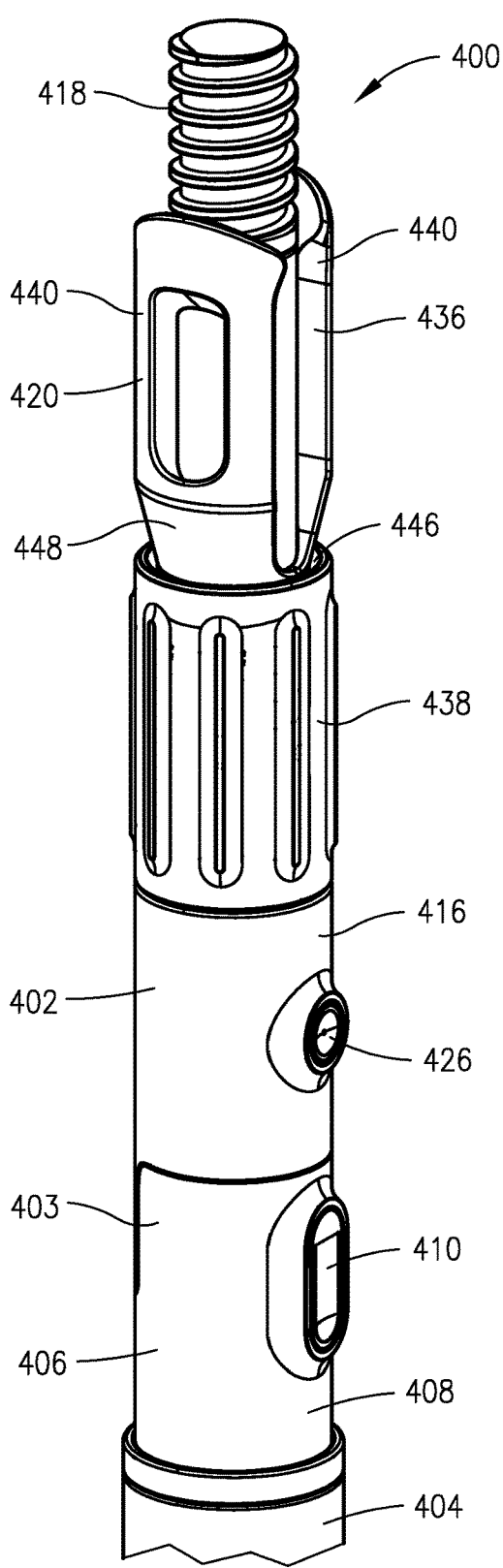
Figure 35:
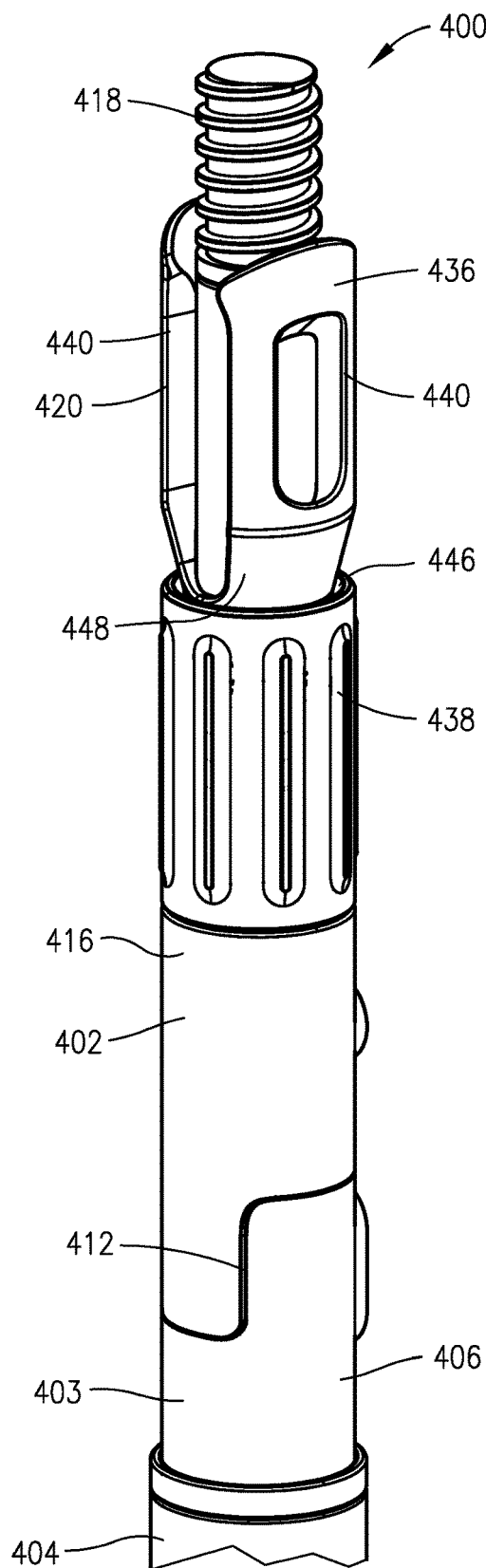
Figure 40:
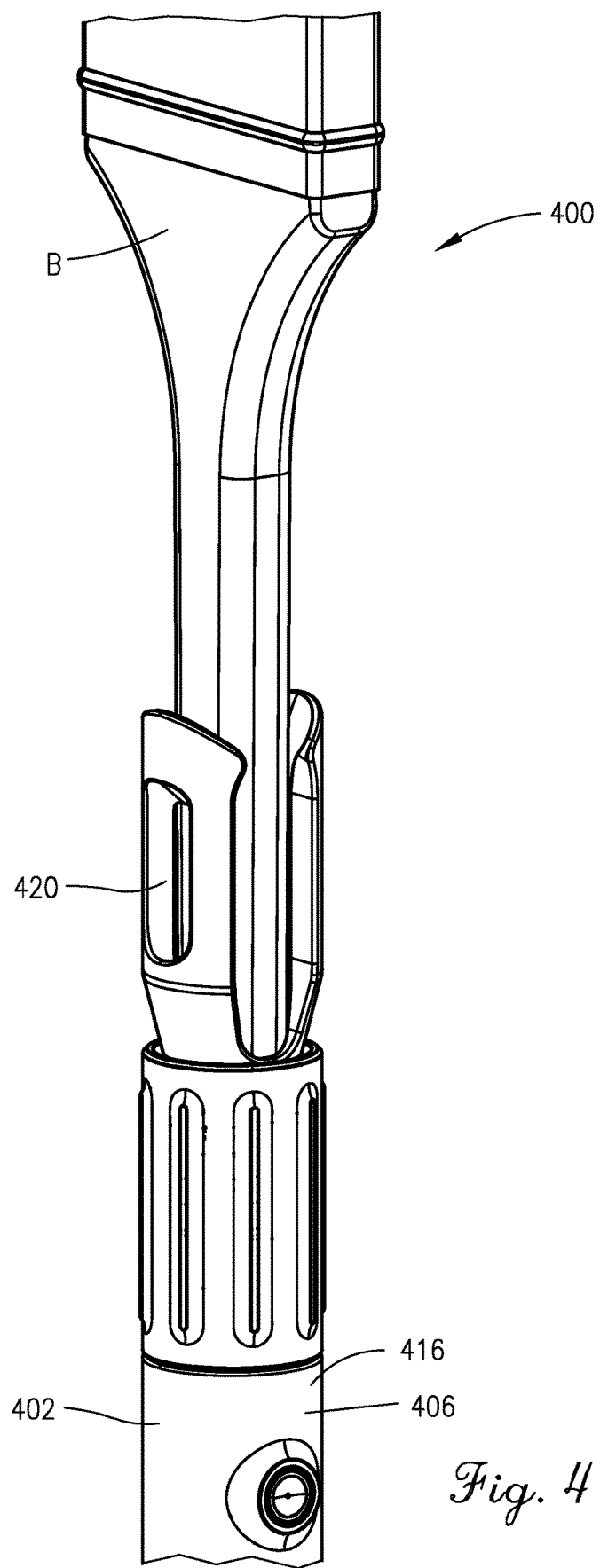
Figure 41:
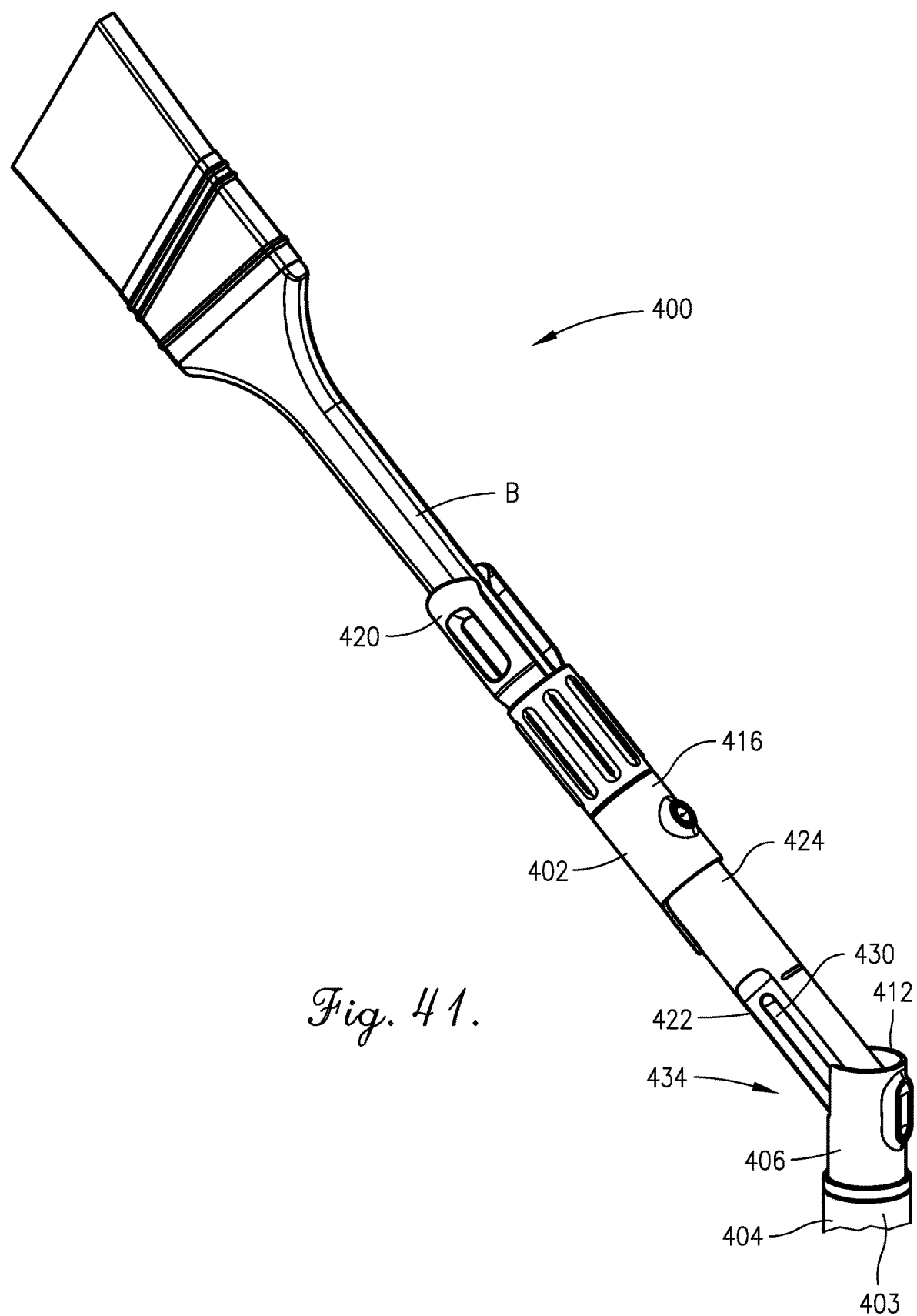
Figure 42:
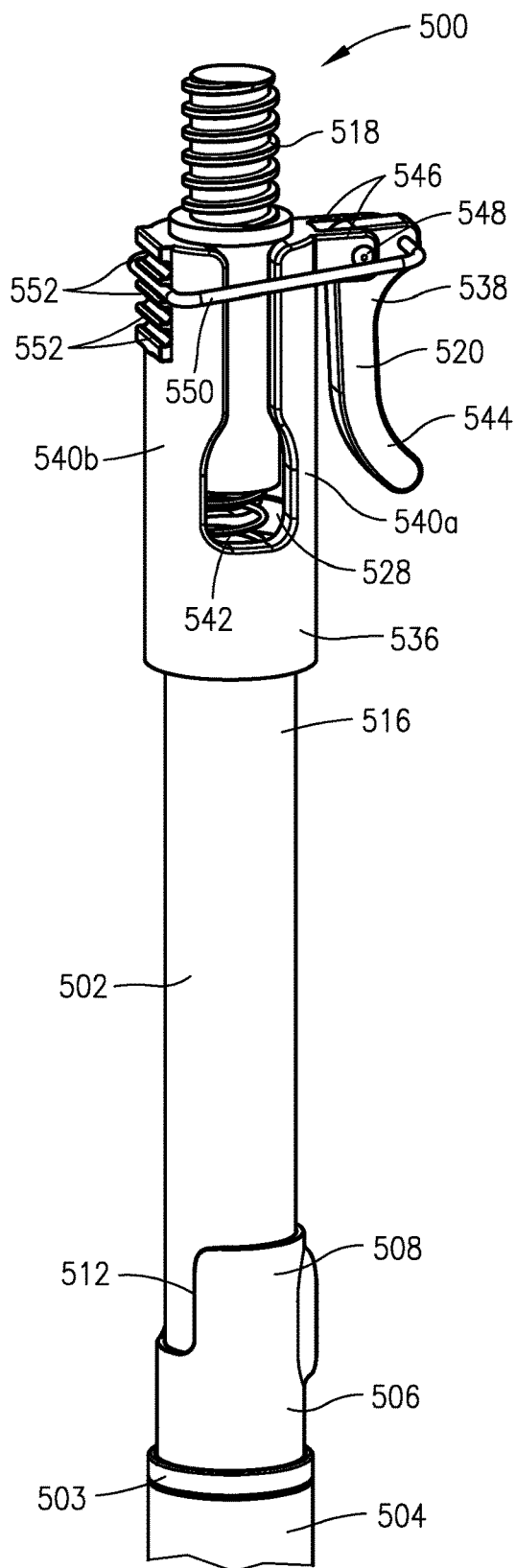
Figure 43:
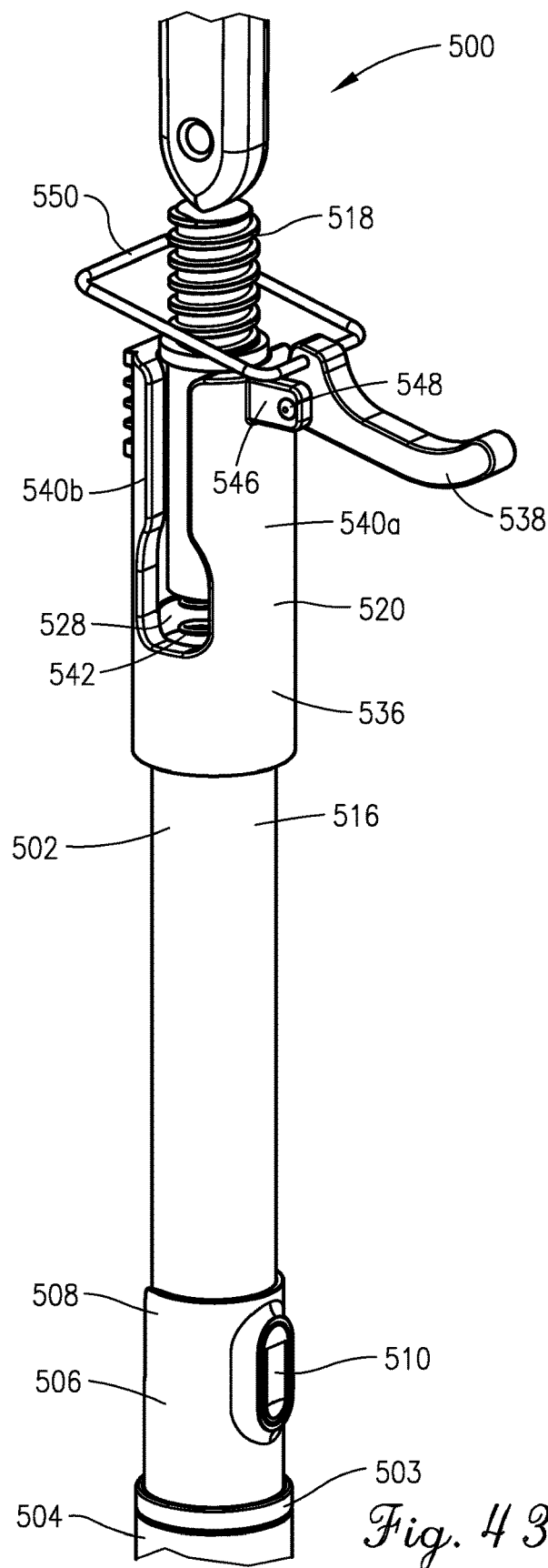
Figure 44:
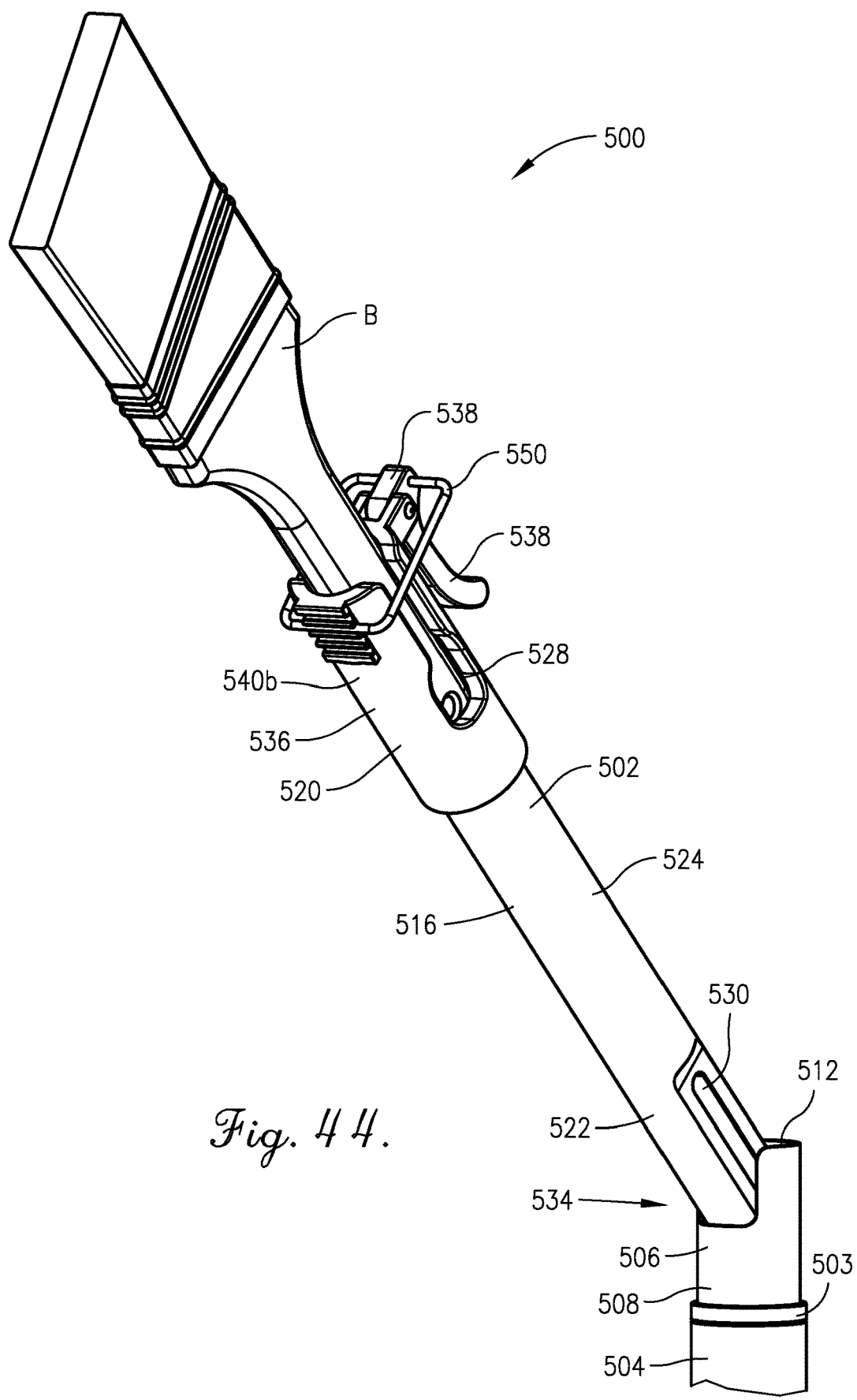
Figure 45:
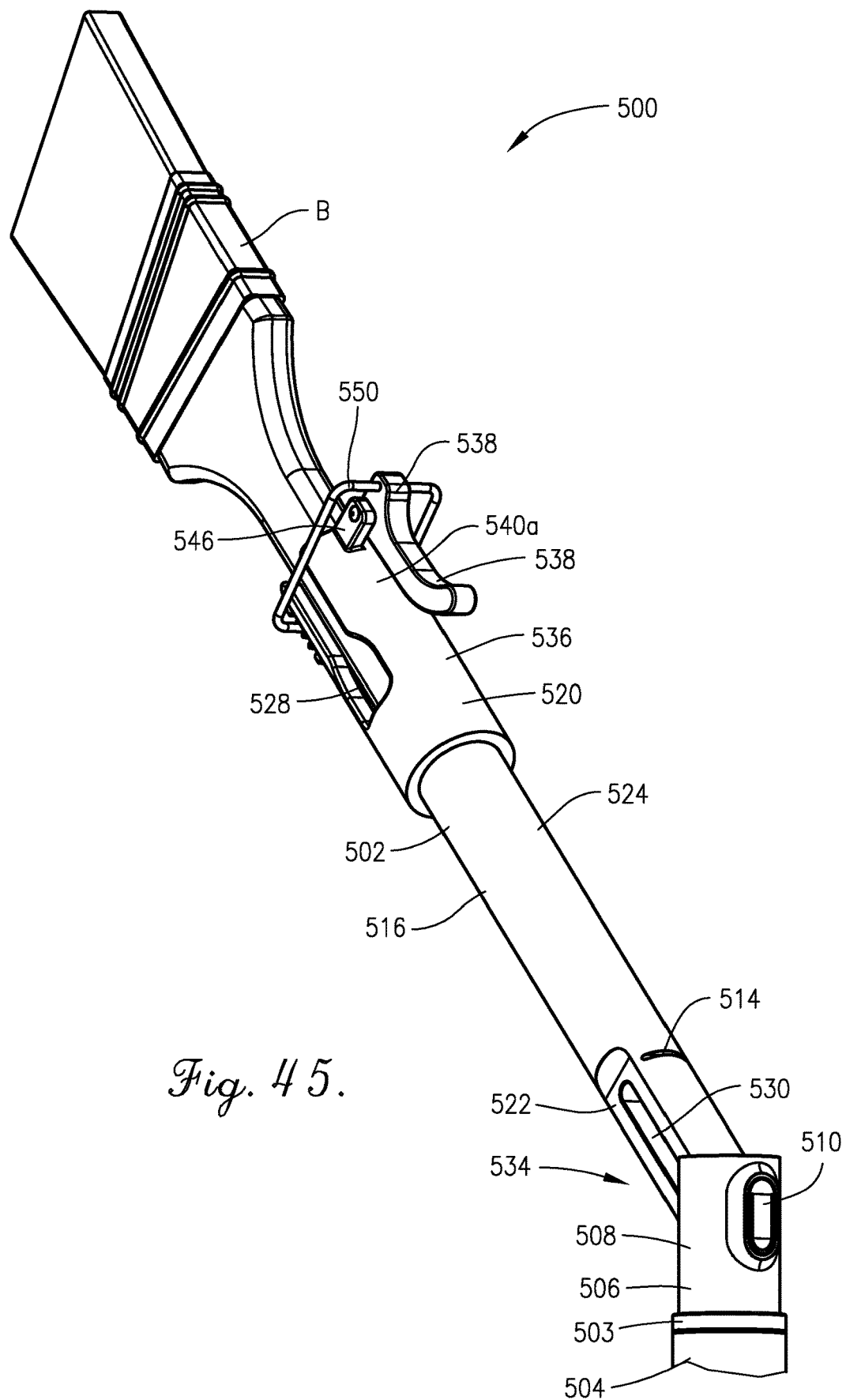

FIG. 12 is a fragmentary perspective of the tool holder shown in FIGS. 1-11, with the clamp connector being removed and the tool holder cross sectioned to show the proximal housing pivotally connected to the support body, and depicting a catch of the proximal housing in engagement with a pivot frame of the support body to restrict relative pivoting between the support body and the proximal housing;

FIG. 13 is a fragmentary side, partially sectioned view of the tool holder shown in FIG. 12;

FIG. 14 is a fragmentary cross section of the tool holder taken along line 14-14 in FIG. 13;

FIG. 15 is a fragmentary cross section of the tool holder taken along line 15-15 in FIG. 13;

FIG. 16 is a fragmentary cross section of the tool holder taken along line 16-16 in FIG. 13;

FIG. 17 is a fragmentary perspective of the tool holder similar to FIG. 12, but showing a lever depressed to permit proximal shifting of the catch, with the catch being disengaged relative to the pivot frame to permit relative pivoting between the support body and the proximal housing;

FIG. 18 is a fragmentary side, partially sectioned view of the tool holder as shown in FIG. 17;

FIG. 19 is a fragmentary cross section of the tool holder taken along line 19-19 in FIG. 18;

FIG. 20 is a fragmentary side, partially sectioned view of the tool holder similar to FIG. 18, but showing the support body and the threaded connector pivoted relative to the proximal housing;

FIG. 21 is a fragmentary perspective of the tool holder shown FIGS. 1-20, with the tool holder cross sectioned and showing a connector body of the threaded connector shifted distally out of engagement with the support body;

FIG. 22 is a fragmentary perspective of the tool holder as shown in FIG. 21, but taken from a different angle;

FIG. 23 is a fragmentary exploded perspective of the tool holder shown in FIGS. 1-22;

FIG. 24 is a fragmentary exploded perspective of the tool holder similar to FIG. 23, but taken from a different angle;

FIG. 25 is a fragmentary perspective of a tool holder constructed in accordance with a second preferred embodiment of the present invention, showing a tool support and proximal body of the tool holder, with the tool support including a support body, a threaded connector, and a clamp connector;

FIG. 26 is a fragmentary perspective of the tool holder shown in FIG. 25, but taken from the opposite side;

FIG. 27 is a fragmentary perspective of the tool holder shown in FIGS. 25 and 26, but taken from a different angle;

FIG. 28 is a fragmentary perspective of the tool holder shown in FIGS. 25-27, showing the tool support rotated relative to the proximal housing to receive a bristle brush;

FIG. 29 is a fragmentary perspective of the tool holder similar to FIG. 28, but taken from a different angle;

FIG. 30 is a fragmentary perspective of a tool holder constructed in accordance with a third preferred embodiment of the present invention, showing a tool support and proximal body of the tool holder, with the tool support including a support body, a threaded connector, and a clamp connector;

FIG. 31 is a fragmentary perspective of the tool holder similar to FIG. 30, but taken from the opposite side;

FIG. 32 is a fragmentary perspective of the tool holder shown in FIGS. 30 and 31, showing the tool support rotated relative to the proximal housing to receive a bristle brush;

FIG. 33 is a fragmentary perspective of the tool holder similar to FIG. 32, but taken from the opposite side;

FIG. 34 is a fragmentary perspective of a tool holder constructed in accordance with a fourth preferred embodiment of the present invention, showing a tool support and proximal body of the tool holder, with the tool support including a support body, a threaded connector, and a clamp connector;

FIG. 35 is a fragmentary perspective of the tool holder similar to FIG. 34, but taken from a different angle;

FIG. 36 is a fragmentary perspective of the tool holder similar to FIG. 34, but showing the tool support extended distally from the proximal housing of the proximal body;

FIG. 37 is a fragmentary perspective of the tool holder similar to FIG. 36, but taken from a different angle, showing part of the proximal housing broken away to depict a proximal end of the tool support;

FIG. 38 is a fragmentary perspective of the tool holder shown in FIGS. 34-37, showing a bristle brush partly inserted into a collet of the clamp connector, with the brush shifting the threaded connector proximally into a bore defined by the collet;

FIG. 39 is a fragmentary cross section of the tool holder and brush shown in FIG. 38;

FIG. 40 is a fragmentary perspective of the tool holder and brush similar to FIG. 38, but showing the brush further inserted in a proximal direction into the collet, with a collar threaded into engagement with jaws of the collet and thereby shifting the jaws into frictional engagement with the brush;

FIG. 41 is a fragmentary perspective of the tool holder and brush shown in FIG. 40, but showing the tool support and brush extended distally from the proximal housing and pivoted relative thereto;

FIG. 42 is a fragmentary perspective of a tool holder constructed in accordance with a fifth preferred embodiment of the present invention, showing a tool support and proximal body of the tool holder, with the tool support including a support body, a threaded connector, and a clamp connector;

FIG. 43 is a fragmentary perspective of the tool holder similar to FIG. 42, but showing a clamp connector with a collet and a latch disengaged from one of the jaws of the collet, with a bristle brush being positioned for insertion into the collet;

FIG. 44 is a fragmentary perspective of the tool holder similar to FIG. 43, but showing the brush inserted into the collet, with the latch engaging both jaws so that the jaws frictionally engage the brush, and showing the tool support and brush extended distally from the proximal body; and FIG. 45 is a fragmentary perspective of the tool holder as shown in FIG. 44, but taken from a different angle.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1, 2, 12, and 13, an adjustable tool holder 50 is operable to be releasably attached to various tools. More preferably, the tool holder is configured for interchangeable use with a variety of tools provided with different connection elements. The tool holder 50 preferably includes a tool support 52 and a proximal body 53. As will be described, the proximal body 53 preferably includes a telescopic extension pole 54 and a proximal housing 56.

Brushes

Turning to FIGS. 1, 2, and 5-7, the illustrated embodiment shows the tool holder 50 in alternating use with a bristle brush 58 and a roller brush 60. The bristle brush 58 (see FIGS. 5-7) is conventional and includes a bristle head 58a mounted on a grip handle 58b that can be grasped by a user. Similarly the roller brush 60 (see FIGS. 1 and 2) includes a cylindrical brush head 60a rotatably supported by a connector handle 60b that can either be grasped by a user or attached to a threaded connector.

The grip handle 58b of the brush 58 preferably presents a grip surface 58c, which provides a connection element configured for one manner of connection with the tool holder 50. The manner of connection provided by the grip surface 58c preferably comprises releasable frictional interconnection between the tool support 52 and the grip handle 58b, as will be discussed.

Although the grip surface 58c provides a male connection element to be frictionally engaged by the tool support 52, the grip handle could present an alternative surface for frictional connection (e.g., where the handle presents a socket that provides a female connection element for frictional engagement with a tool holder).

Furthermore, the principles of the present invention are applicable where an alternative bristle brush uses the same working element (i.e., the bristle head) while utilizing another type of connection element associated with a different manner of connection. For instance, the handle of the bristle brush could be alternatively configured to include a threaded connection element.

Figure 1:
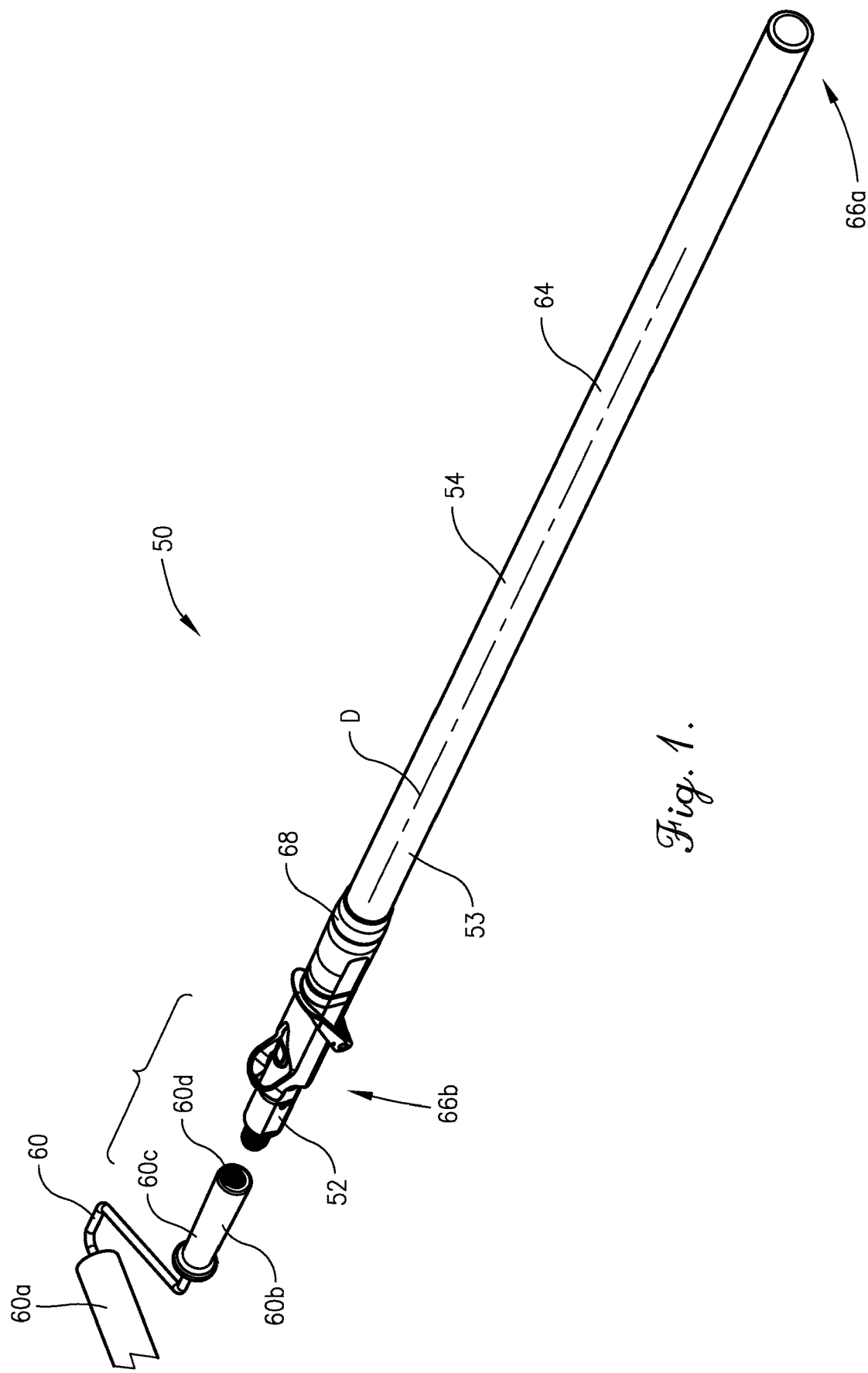
FIG. 1 is a perspective of a tool holder constructed in accordance with a first preferred embodiment of the present invention, showing the tool holder positioned for connection to a roller brush.

The connector handle 60b of the roller brush 60 preferably presents a grip surface 60c and includes a threaded female connector 60d (see FIG. 1). The threaded female connector 60d provides a connection element configured for another manner of connection with the tool holder 50. The manner of connection provided by the connector 60d preferably comprises threadably interconnecting the tool support 52 and the threaded female connector 60d, as will be explained below.

Although the connector 60d provides a female connection element to be threadably engaged by the tool support 52, the connector could present an alternative connector for threaded connection (e.g., where the handle of the roller brush presents a threaded shaft that provides a male connection element for threaded engagement with a tool holder).

It is also within the ambit of the present invention where an alternative roller brush uses the same working element (i.e., the roller head) while utilizing another type of connection element associated with a different manner of connection. For instance, the brush could use the grip surface of the handle as a connection element for frictional interconnection between the tool support and the handle.

The principles of the present invention are also applicable where the tool holder 50 receives and engages alternative tools. For instance, the tool holder could be alternatively configured to engage various other manually held tools, such as other painting tools (e.g., a foam brush, paint edger, corner painter, etc.), a letter-changing tool for an advertising sign, a cleaning tool (e.g., a dusting tool or a scraping tool), a washing tool (e.g., a water spray nozzle), surface finishing tools (e.g., sanding tools or staining tools), etc. Such alternative tools could include connection elements similar to those found on the depicted brushes or another type of connection element.

Proximal Body with Extension Pole

Turning to FIGS. 3, 4, and 9-11, the extension pole 54 preferably comprises a telescopic pole with inner and outer pole sections 62,64 that are telescopically interfitted and slide relative to one another along a pole axis P (see FIG. 1). The pole 54 also presents proximal and distal pole ends 66a,b (see FIG. 1). The extension pole 54 further includes a cam mechanism 68 (see FIGS. 5-11) to selectively lock the pole sections 62,64 in a predetermined position relative to one another.

The inner pole section 62 preferably presents oppositely spaced longitudinal planar sides 70 (see FIGS. 5-11). As will be discussed, the sides 70 are configured to engage the housing 56 and restrict relative rotation therebetween about the pole axis P. The distal pole end 66b presented by the inner pole section 62 is preferably slotted (see FIGS. 8, 20, and 24) to permit pivoting of the tool support 52 relative to the proximal housing 56.

Turning to FIGS. 5-11, the cam mechanism 68 includes complemental proximal and distal sleeves 72,74 that are rotatably mounted to one another. The distal sleeve 74 presents an inner bearing surface 74a and a bore 74b (see FIG. 8). The inner bearing surface 74a defines an annular groove 74c. The bore 74b generally corresponds in shape to the inner pole section 62 (see FIG. 6) and includes opposed flats that slidably engage the longitudinal planar sides 70 of the inner pole section 62. The distal sleeve 74 also presents opposite lugs 75 at a distal end of the sleeve 74 (see FIG. 8).

The proximal sleeve 72 presents a socket 72a that preferably receives and is fixed to a distal end 76 of the outer pole section 64 (see FIG. 10). The proximal sleeve 72 also includes a cam sleeve 78 defined by an outer bearing surface 78a and an offset bore 78b (see FIGS. 8-11). The outer bearing surface 78a presents an annular rib 78c. The bore 78b is preferably axially offset from the outer bearing surface 78a so that the thickness of the cam sleeve 78 tapers circumferentially (see FIG. 11).

The inner bearing surface 74a of the distal sleeve 74 is slidably received on the outer bearing surface 78a of the proximal sleeve 72 so that the sleeves 72,74 are rotatable relative to one another. The rib 78c slidably engages the groove 74c to restrict axial separation of the sleeves 72,74.

The proximal sleeve 72 and the outer pole section 64 are fixed to one another. Preferably, the proximal sleeve 72 and outer pole section 64 are rotatable relative to the distal sleeve 74 and inner pole section 62 into and out of a locked condition (see FIGS. 9-11). In the locked condition, the sleeves 72,74 are urged into frictional engagement with the inner pole section 62 to lock the pole sections 62,64 and restrict relative axial sliding movement therebetween. Similarly, the proximal sleeve 72 and outer pole section 64 are rotatable into an unlocked condition (not shown). In the unlocked condition, frictional engagement between the sleeves 72,74 and the inner pole section 62 is preferably minimized so that the pole sections 62,64 can freely slide axially relative to one another.

The illustrated pole 54 and the proximal housing 56 cooperatively provide the proximal body 53. The proximal body 53 is coupled to the tool support 52 adjacent the distal end 66b, as will be discussed. The extension pole 54 provides a preferred embodiment of an elongated grasping handle. However, it will be appreciated that the tool holder could have various handle configurations without departing from the scope of the present invention.

Although the tool holder 50 preferably includes the extension pole 54, it is equally within the scope of the present invention where an alternative handle structure is provided to grasp the tool holder. For instance, the pole 54 could be replaced with a unitary handle element. It will be appreciated that alternative tool holder embodiments could include handles of various lengths. For some aspects of the present invention, the proximal body could alternatively include a connector for attachment to another extension pole (e.g., a handle may be eliminated entirely).

Turning to FIGS. 12-24, the illustrated proximal housing 56 is preferably attached to the inner pole section 62 and is adjustably attached to the tool support 52. The proximal housing 56 preferably includes a frame 82, a slidable catch 84, a shiftable lever 86, and a spring 87. The proximal housing 56 also presents a housing axis H (see FIG. 13).

The illustrated frame 82 includes opposite frame sections 82a,b that cooperatively support the catch 84 and the lever 86. The frame sections 82a,b are removably attached to one another and cooperatively define a slotted cavity 88 (see FIGS. 12 and 13) to receive the catch 84, lever 86, and spring 87. The frame 82 also includes an axle 90 (see FIGS. 13 and 23) that rotatably receives the tool support 52.

Yet further, the frame sections 82a,b present respective flat surfaces 92 (see FIGS. 14 and 15). The flat surfaces 92 are shaped to engage corresponding sides 70 of the inner pole section 62 and restrict relative rotation therebetween about the housing axis H.

The frame 82 is removably secured within the inner pole section 62 by threaded fasteners 94 (see FIGS. 23 and 24). However, it is also within the ambit of the present invention where the proximal housing 56 and extension pole 54 are alternatively secured to one another.

In the illustrated embodiment, the housing axis H is substantially coaxially aligned with the pole axis P (see FIG. 13), although the axes P,H can be off-axis relative to one another.

Turning to FIGS. 12, 13, 17, 18, 23, and 24, the depicted catch 84 is configured to selectively engage the tool support 52 and restrict pivotal movement of the tool support 52 relative to the proximal housing 56. The catch 84 is preferably unitary and presents two (2) rows 96 of teeth at one end thereof to releasably engage the tool support 52 (see FIG. 24). Each toothed row 96 is curved to form a generally concave shape that receives a complementally shaped row of teeth. At the other end of the catch 84, the catch 84 presents a catch bearing surface 98 (see FIGS. 17 and 18). The catch 84 is slidably received between the frame sections 82a,b and is slidable between an engaged position (see FIGS. 12 and 13) and a disengaged position (see FIGS. 17 and 18).

The lever 86 is configured to be selectively operated by a user and is shiftable to permit proximal and distal sliding of the catch 84. The lever 86 includes a hinge portion 99 (see FIGS. 12 and 13) pivotally mounted on the frame 82. The lever 86 also presents a lever bearing surface 100 (see FIG. 24) that slidably engages the catch bearing surface 98. The spring 87 engages the lever 86 and is configured to urge the lever 86 into an extended position (see FIGS. 12 and 13) associated with the catch 84 in the engaged position. The lever 86 is configured to be depressed by the user and shifted from the extended position to a retracted position (see FIGS. 17 and 18). With the lever 86 retracted, the catch 84 is operable to be displaced proximally from the engaged position to the disengaged position.

The frame 82, catch 84, and lever 86 are each preferably formed of a synthetic resin material. Most preferably, the frame 82, catch 84, and lever 86 are injection molded from a synthetic resin. However, the principles of the present invention are applicable where one or more of the frame, catch, and lever include an alternative material, such as a metal material (e.g., aluminum, carbon steel, stainless steel, etc.).

Tool Support

Turning to FIGS. 2-5 and 17-24, the illustrated tool support 52 is configured for interchangeable use with a variety of tools provided with different connection elements. Preferably, the tool support 52 includes a distal support body 106, a threaded connector 108, and a clamp connector 110 (see FIGS. 2 and 3).

As will be described in greater detail, the connectors 108,110 are preferably shiftable relative to one another so as to be alternatively located distally. Each connector 108,110 is at least in part positionable distally of the other connector 108,110 to facilitate connection to the connection element of the corresponding tool (such as one of the brushes 58,60). Furthermore, according to some aspects of the present invention, each connector 108,110 and the corresponding tool are preferably configured to provide the sole connection between the tool holder 50 and the corresponding tool.

Referring to FIGS. 17-24, the distal support body 106 is preferably configured to support the tool connectors 108,110 so that the tool connectors 108,110 are shiftable relative to one another and can be alternatively located distally to facilitate connection to a connection element of a respective tool. As will be described, the clamp connector 110 can be selectively positioned on the support body 106 for pivoting therewith.

The depicted support body 106 is pivotally mounted to the proximal body 53 and can be selectively secured in various orientations. The support body 106 preferably includes a pivot frame 112 and a tube 114 that receives a distal end of the pivot frame 112. The support body 106 also defines a support axis S (see FIGS. 13 and 20).

The depicted tube 114 is unitary and includes a tubular body 116 that presents proximal and distal ends 116a,b (see FIGS. 21 and 24). The tube 114 also includes a conically shaped receptacle 118 integrally formed with the body 116. The receptacle extends partly into the body 116 from the distal end 116b.

The tube 114 also preferably presents oppositely spaced longitudinal planar sides 120 (see FIG. 23) similar to the sides of the inner pole section 62. At the distal end 116b, the tube 114 defines an endless toothed margin 122 (see FIG. 24) configured to engage the threaded connector 108. The receptacle 118 also presents a splined bore 124 (see FIG. 24). The tube 114 further presents opposite lugs 126 at the proximal end 116a (see FIGS. 23 and 24).

The pivot frame 112 is preferably configured to selectively engage the catch 84 and restrict pivotal movement of the tool support 52 relative to the proximal housing 56. The frame 112 preferably presents a bore 128 (see FIGS. 12, 17, 23, and 24) that is rotatably received on the axle 90. Thus, the frame 112 and proximal housing 56 cooperatively form a pivot joint 130 (see FIGS. 13, 18, and 20) that permits the tool support 52 to swing relative to the proximal body 53.

Although the pivot joint 130 is preferably formed by the depicted structure of the support body 106 and the proximal housing 56, the pivot joint 130 could be alternatively configured (as will be shown in subsequent embodiments).

The pivot frame 112 also preferably presents two (2) rows 132 of teeth at one end thereof to releasably engage the catch 84 (see FIGS. 18, 23, and 24). Each toothed row 132 is curved about the bore 128 to form a generally convex shape. Each toothed row 132 is configured to releasably engage a corresponding toothed row 96 of the catch 84 when the catch 84 is in the engaged position.

Thus, in the engaged position, the pivot frame 112 and proximal housing 56 cooperatively restrict relative pivotal movement between the tool support 52 and the proximal housing 56 (see FIGS. 12 and 13). In the disengaged position, the toothed rows 96,132 are preferably disengaged from each other to permit relative pivotal movement between the tool support 52 and the proximal housing 56 (see FIGS. 17 and 18).

Each pair of engageable toothed rows 96,132 are preferably configured to be removably engaged with one another in a plurality of discrete orientations of the tool support 52 and proximal housing 56. That is the toothed rows 96,132 permit the tool support 52 and proximal housing 56 to be adjustably engaged in one of a range of discrete pivotal positions.

While the tool holder 50 preferably includes the depicted structure of the pivot frame 112 and proximal body 53 to provide adjustable pivoting of the tool support 52, the tool holder 50 could include alternative structure (as shown in subsequent embodiments) for adjustable pivoting of the tool support.

The pivot frame 112 is preferably formed of a synthetic resin material. Most preferably, the frame 112 is injection molded from a synthetic resin. However, the principles of the present invention are applicable to forming the frame from an alternative material(s), such as a metal material (e.g., aluminum, carbon steel, stainless steel, etc.), or alternative techniques, such as extrusion, machining, etc.

The pivot joint 130 permits the support body 106 to swing relative to the proximal body 53 between an aligned condition (see FIGS. 12, 13, 17, and 18) and a maximum offset condition (not shown). In the aligned condition, the housing axis H and the support axis S are substantially coaxially aligned with one another (see FIG. 13). When the pivot joint 130 is disengaged, the support body 106 can be swung into and out of the aligned condition.

The pivot joint 130 can be disengaged to swing the support body 106 among a range of positions where the housing axis H and the support axis S are off-axis relative to each other and define an offset angle θ (e.g., see FIG. 20). In the maximum offset condition, the axes H,S cooperatively define a maximum value of the angle θ. The maximum angle θ preferably ranges from about eighty degrees (80°) to about one hundred twenty degrees (120°), although the maximum angle θ could fall outside this range in certain aspects of the present invention.

The principles of the present invention are applicable where the distal support body is alternatively constructed (e.g., to provide an alternative mechanism that permits relative shifting of the connectors 108,110). Furthermore, the distal support body could be alternatively shiftably mounted relative to the proximal body 53.

Yet further, for some aspects of the present invention, the tool holder could be devoid of a support body. For instance, at least one of the connectors 108,110 could be alternatively configured for attachment to the proximal body. In some alternative embodiments, one of the connectors could also be mounted to the other one of the connectors.

Tool Connectors

Turning to FIGS. 20-24, the threaded connector 108 comprises one type of tool connector. As will be discussed, the threaded connector 108 provides one manner of tool connection that involves releasable threaded interconnection between the threaded connector 108 and the roller brush 60 (or another tool).

The threaded connector 108 preferably includes a connector body 134, fasteners 136, and a spring 138. The connector body 134 preferably includes a threaded shaft 140 that extends distally from a toothed flange 142. The connector body 134 further includes a splined shaft 144 that extends proximally from the flange 142.

The connector body 134 is preferably formed of a synthetic resin material. Most preferably, the connector body 134 is injection molded from a synthetic resin. However, the principles of the present invention are applicable to forming the connector body from an alternative material(s), such as a metal material (e.g., aluminum, carbon steel, stainless steel, etc.), or alternative techniques, such as extrusion, machining, etc.

When the connector 108 is installed on the support body 106, the spring 138 preferably urges the threaded connector 108 and support body 106 into engagement with one another (e.g., see FIG. 20). In the illustrated embodiment, when the connector 108 and support body 106 are engaged, the splined shaft 144 engages the splined bore 124 and the teeth of the flange 142 engage the toothed margin 122 to restrict relative rotation between the threaded connector 108 and support body 106.

The threaded connector 108 is also preferably configured to be disengaged from the support body 106. In the depicted embodiment, the spring 138 permits the connector body 134 to be shifted distally from the support body 106 and disengaged so that the splined shaft 144 is spaced from the splined bore 124 and the flange 142 is spaced from the toothed margin 122 (see FIGS. 21 and 22).

When disengaged, the connector body 134 is operable to be rotated relative to the support body 106 about the support axis S. The configuration of interengaging teeth and splines permit the connector body 134 to be removably engaged with the support body 106 in a plurality of discrete orientations. In other words, the connector body 134 and the support body 106 are configured to be adjustably engaged in one of a range of discrete rotational positions.

The construction of the depicted connector 108 permits a tool (such as brush 60) to be securely attached to the connector body 134 and then selectively rotated with the connector body 134 about the axis S and relative to the support body 106. This enables the tool to be selectively secured in one of various orientations relative to the extension pole 54.

To secure the tool onto the tool support 52, the threaded shaft 140 of the connector 108 is operable to be removably threadably interconnected with the female threaded connector 60*d*. Thus, the threaded connector 108 and the female connector 60*d* provide one manner of connecting a tool to the tool support 52.

The connector 108 preferably includes a threaded male connector that provides for threadably interconnecting the tool support 52 and the brush 60. However, the connector 108 could present an alternative connector structure for threaded connection. For instance, the connector could present a threaded socket that provides a female threaded connection element for threaded engagement with a male threaded connector of a tool.

It is also within the ambit of the present invention where the connector 108 uses another type of connection element (i.e., not a threaded connection element) associated with a different manner of connection. For instance, the connector could present a surface as a connection element operable for frictional interconnection between the tool support and the tool. For example, alternative frictional, socket-type connections are often used in Europe, where the tool or tool holder have a tapered female socket in which a complemental male connector is forcibly inserted to provide frictional connection.

The scope of the present invention is also applicable where the connector body 134 is alternatively supported for rotation about the axis S. Furthermore, the connector 108 could be alternatively mounted for alternative shifting (e.g., sliding as shown in subsequent embodiments). Yet further, for some aspects of the present invention, the threaded connector could be fixed relative to the proximal body 53.

Turning to FIGS. 2-8, the clamp connector 110 comprises another type of tool connector. As will be discussed, the clamp connector 110 provides another manner of tool connection that involves releasable frictional interconnection between the clamp connector 110 and the brush 58 (or another tool).

Figure 6:
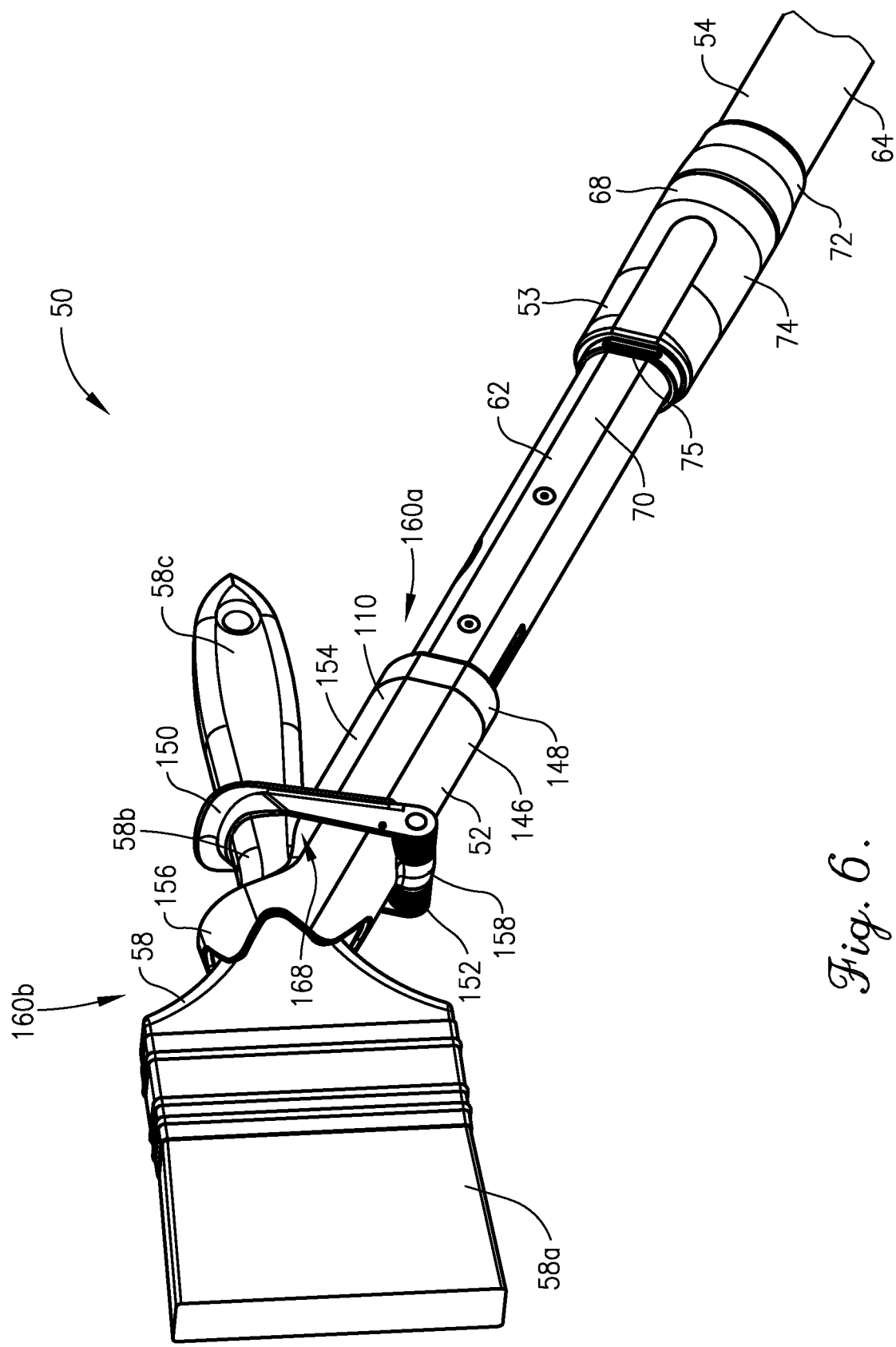
FIG. 6 is a fragmentary perspective of the tool holder and bristle brush similar to FIG. 5, but taken from a different angle.

The clamp connector 110 preferably includes a clamp body 146, a snap ring 148, a clamp lever 150, and a torsion spring 152 (see FIGS. 2 and 6). The illustrated clamp body 146 has a unitary and tubular construction and is configured to be slidably received on the support body 106 and the proximal body 53. As will be explained below, the slidable mounting of the clamp body 146 enables the clamp connector 110 to move between a retracted position on the proximal body 53 and an extended position on the support body 106.

The clamp body 146 comprises a unitary structure that includes a tubular section 154, a loop section 156, and a boss 158 (see FIG. 6). The clamp body 146 also presents proximal and distal ends 160*a,b* and a bore 162 that extends axially along a bore axis B between the ends 160*a,b* (see FIGS. 4 and 5). The loop section 156 defines the distal end 160*b* and presents a loop opening 164 (see FIGS. 2 and 5) to receive the brush 58 (or another tool). Preferably, the loop section 156 presents opposite pairs of scalloped notches that adjustably receive and engage the brush head 58*a*.

The clamp body 146 is preferably formed of a synthetic resin material. Most preferably, the clamp body 146 is injection molded from a synthetic resin. However, the principles of the present invention are applicable to forming the clamp body from an alternative material(s), such as a metal material (e.g., aluminum, carbon steel, stainless steel, etc.), or alternative techniques, such as extrusion, machining, etc.

The snap ring 148 preferably comprises a flexible and elastic ring. The snap ring 148 is mounted at the proximal end 160*a* and presents a continuous rim 166 (see FIG. 4). The rim 166 is configured to engage the lugs 75 of the sleeve 74 in the retracted position to restrict distal sliding movement of the clamp body 146 relative to the proximal body 53 (see FIG. 4). The rim 166 is also preferably configured to engage the lugs 126 of the support body 106 in the extended position to restrict proximal sliding movement of the clamp body 146 relative to the support body 106 (see FIG. 5).

The clamp lever 150 comprises a U-shaped metal body and is pivotally mounted to the boss 158 with a pin. The lever 150 is operable to swing between a closed position (see FIGS. 2 and 3), where the clamp lever 150 engages the clamp body 146, and an open position (see FIGS. 5-7), where the clamp lever 150 and clamp body 146 form an adjustable opening 168 to receive the brush 58 (or another tool).

The spring 152 preferably engages and urges the clamp lever 150 toward the closed position. When the brush 58 is received in the openings 164,168, the spring 152 urges the clamp lever 150 into frictional engagement with the handle of the brush 58. As a result, the lever 150 cooperates with the clamp body 146 to frictionally grasp the handle and restrict removal of the brush 58 from the clamp connector 110.

Figure 7:
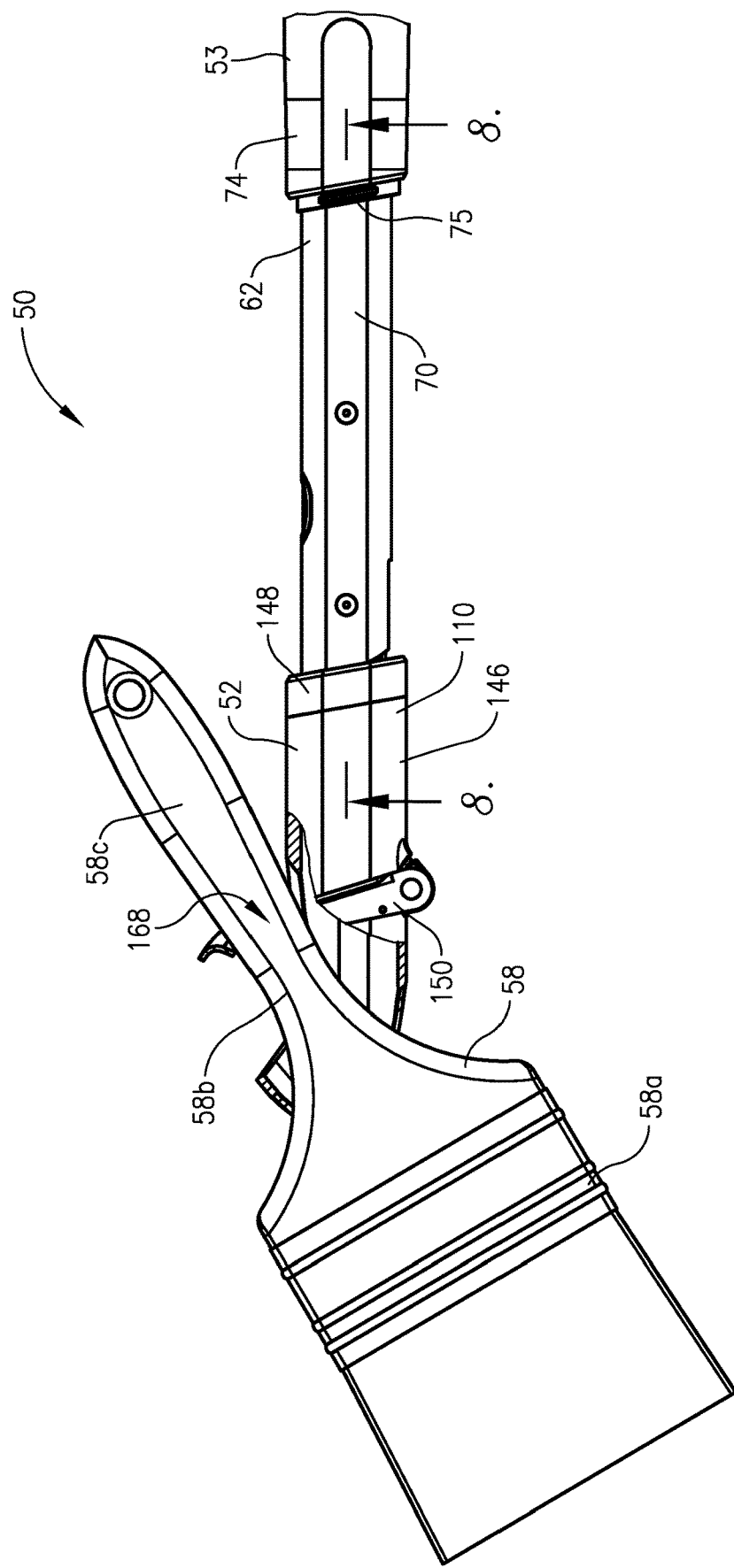
FIG. 7 is a fragmentary side elevation of the tool holder and bristle brush shown in FIGS. 5 and 6.

The clamp connector 110 is preferably slidable between the retracted position and the extended position when the support body 106 and proximal body 53 are in the aligned condition (see FIGS. 3 and 7).

On the other hand, when the proximal body 53 and support body 106 are off-axis relative to each other, the clamp connector 110 is restricted from sliding between the extended and retracted positions.

The clamp connector 110 is preferably slidable so that the connectors 108,110 are shiftable relative to one another along the bore axis B. Again, the connectors 108,110 are preferably shiftable relative to one another so as to be alternatively located distally. Each connector 108,110 is at least in part positionable distally of the other connector 108,110 to facilitate connection to the connection element of the respective tool.

Figure 5:
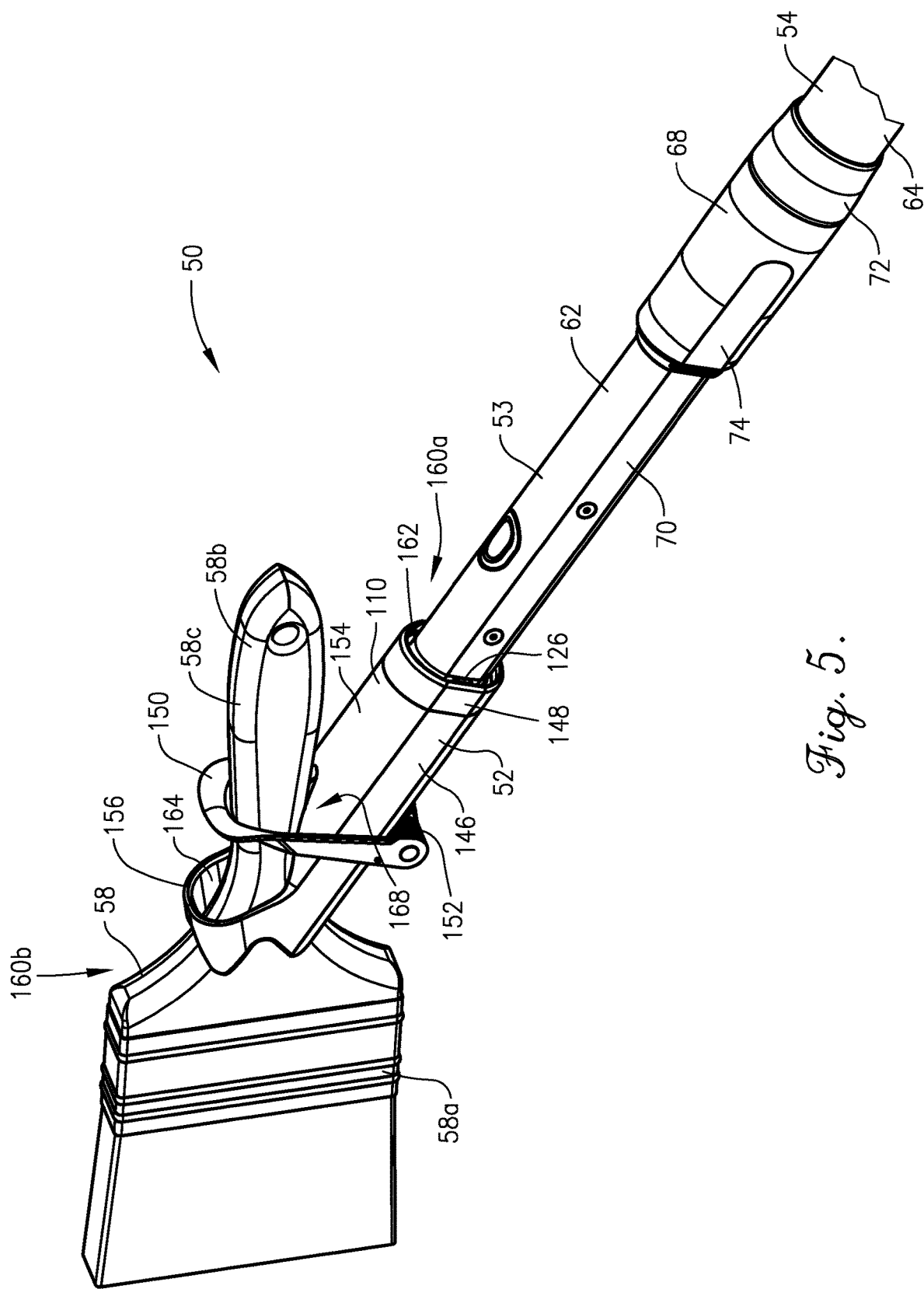
FIG. 5 is a fragmentary perspective of the tool holder shown in FIGS. 1-4, but showing the clamp connector shifted distally into an extended position, with the clamp connector being located distally of the threaded connector, and showing a bristle brush releasably frictionally secured to the clamp connector.

In the depicted embodiment, the clamp connector 110 is preferably located in the extended position for attachment to the brush 58 (see FIGS. 5-7). When in the extended position, the loop section 156 is spaced distally of the threaded connector 108 and support body 106 so that the opening 164 is unobstructed. Also when in the extended position, the connector 110 is preferably located distally of the connector 108 and partly covers the connector 108. In this manner, the connector 110 restricts access to the connector 108.

The brush 58 can be selectively inserted through the openings 164,168 and releasably frictionally secured therein. When secured, the loop section 156 releasably frictionally engages the brush head 58*a* and the clamp lever 150 and clamp body 146 cooperatively and releasably frictionally engage the handle 58*b*.

In the extended position, the clamp connector 110 preferably pivots with the support body 106. That is, the clamp connector 110 is received on the support body 106 and located distally of the pivot joint 130 so that the clamp connector 110 can swing with the support body 106.

On the other hand, in the retracted position, the proximal body 53 extends through the bore 162 and across the opening 164 to restrict any tool from being inserted through the opening 164 (see FIGS. 2 and 3).

In the retracted position, the clamp connector 110 preferably does not pivot with the support body 106. That is, the support body 106 is operable to pivot relative to the proximal body 53 and the clamp connector 110 when the clamp connector 110 is retracted.

For some aspects of the present invention, the clamp connector 110 could be configured for use when in the retracted position. For instance, it will be appreciated that the clamp lever 150 can be opened (e.g., to receive a tool) when the clamp connector 110 is retracted.

While the illustrated slidable mounting configuration for the clamp connector 110 is preferred, the clamp connector could be alternatively mounted relative to the support body for proximal and distal sliding movement.

The clamp connector could also be alternatively mounted for alternative shifting. Yet further, for some aspects of the present invention, the clamp connector could be fixed relative to the proximal body (e.g., where the threaded connector is axially shiftable relative to the clamp connector and the proximal body).

The clamp connector 110 preferably presents surfaces that provide a connection element configured for one manner of connection with the tool holder. The manner of connection provided by the clamp connector 110 preferably comprises releasable frictional interconnection between the tool support 52 and the respective tool.

However, the clamp connector 110 could present one or more alternative surfaces for frictional connection (e.g., where the connector presents a shaft that provides a male connection element for frictional engagement with the complemental socket of a tool, as described above).

Furthermore, the principles of the present invention are applicable where the connector utilizes another type of connection element associated with a different manner of connection. For instance, the connector could be alternatively configured to include a threaded connection element.

Using the Tool Holder

In use, the tool holder 50 is configured to be used interchangeably with a variety of tools, including the brushes 58,60. Each brush 58,60 is connectable to the tool holder 50 in a different manner. The tool holder 50 is preferably used by releasably connecting a first one of the tools to a first tool connector of the tool holder 50. For instance, the brush 58 can be releasably connected to the clamp connector 110. Alternatively, the brush 60 can be releasably connected to the threaded connector 108.

The first tool connector is preferably located at least in part distally of a second one of the tool connectors to facilitate connection of the first tool to the first tool connector. Thus, if the first tool connector is not at least partly located distally of the second tool connector (e.g., where the first tool connector is proximal relative to the second tool connector), the tool connectors are preferably shiftable relative to one another to locate the first tool connector at least in part distally relative to the second tool connector. As disclosed in the preferred embodiment, relative shifting between the connectors 108,110 preferably involves relative shifting along the axis of the tool holder 50 and relative to the proximal body 53.

The user can then selectively disconnect the first tool from the first tool connector. If the brush 58 is connected to the clamp connector 110, the user can selectively disconnect the brush 58 from the clamp connector 110. Similarly, if the brush 60 is connected to the threaded connector 108, the user can selectively disconnect the brush 60 from the threaded connector 108.

After connecting a first tool to a first tool connector of the tool holder 50 (and then disconnecting the first tool from the first tool connector), a second one of the tools can be releasably connected to a second tool connector of the tool holder 50. Preferably, before connecting the second tool, the first and second tool connectors of the tool holder 50 are shifted relative to one another so as to locate the second tool connector at least in part distally relative to the first tool connector.

This shifting step is preferably done after disconnecting the first tool and the first tool connector from each other. However, it is within the scope of the present invention where the shifting step is done during the step of disconnecting the first tool. Furthermore, for some aspects of the present invention, the shifting step could be done prior to the step of disconnecting the first tool (i.e., such that the first tool connector is proximal relative to the second tool connector prior to disconnecting the first tool).

The second tool is preferably releasably connected to the second tool connector after shifting the first and second tool connectors relative to one another to locate the second tool connector distally relative to the first tool connector. However, it is within the scope of the present invention where the step of connecting the second tool is done during the shifting step. Furthermore, for some aspects of the present invention, the step of connecting the second tool could be done prior to the shifting step (i.e., such that the second tool is connected while the second tool connector is proximal relative to the first tool connector). Yet further, for some aspects of the present invention, the step of connecting the second tool could be done during or prior to the step of disconnecting the first tool (such that both tools are connected to the corresponding tool connectors at the same time). After connecting the second tool to the second tool connector, the user can selectively disconnect the second tool from the second tool connector.

In one example of using the illustrated embodiment, the roller brush 60 can be releasably connected to the threaded connector 108. The threaded connector 108 is preferably located at least in part distally of the connector 110 to facilitate connection of the roller brush 60 to the threaded connector 108. Once the brush 60 is connected to the threaded connector 108, the user can selectively disconnect the brush 60 from the threaded connector 108. The user can then releasably connect the brush 58 to the clamp connector 110. Preferably, before connecting the brush 58 to the clamp connector 110, the clamp connector 110 is shifted distally relative to the proximal body so that the clamp connector 110 is located at least in part distally relative to the threaded connector 108.

ALTERNATIVE EMBODIMENTS

Turning to FIGS. 25-45, alternative preferred embodiments of the present invention are depicted.

With an initial attention to FIGS. 25-29, an alternative tool holder 200 is constructed in accordance with a second embodiment of the present invention. For the sake of brevity, the description of the alternative tool holder 200 will focus primarily on the differences of this alternative embodiment from the first preferred embodiment described above.

The tool holder 200 preferably includes an alternative tool support 202 and proximal body 203. The proximal body 203 includes a telescopic extension pole 204 and an alternative proximal housing 206.

The proximal housing 206 is preferably attached to the extension pole and is adjustably attached to the tool support 202. The proximal housing 206 preferably includes a yoke 208, a slidable catch 210, and a spring 212 (see FIGS. 25-27). The yoke 208 has a unitary construction and includes a pair of yoke arms 214 that pivotally receive the tool support 202.

The catch 210 is unitary and includes a pawl 216 (see FIG. 27). The catch 210 is slidably received in a slot 218 (see FIG. 26) presented by one of the yoke arms 214. The spring 212 is operably mounted within the slot 218 and engages the catch 210 to urge the catch 210 toward a distal end of the corresponding yoke arm 214.

The tool support 202 is configured for interchangeable use with a variety of tools provided with different connection elements. Preferably, the tool support 202 includes a distal support body 220, a threaded connector 222, and a clamp connector 224.

Turning to FIGS. 25-27, the distal support body 220 is configured to support the connectors 222,224 so that the connectors are swingable together with the support body 220. The connectors 222,224 are also preferably swingable relative to the yoke 208 and the extension pole 204. In this manner, the connectors 222,224 can be alternatively located distally to facilitate connection to a connection element of a respective tool.

The clamp connector 224 preferably includes a clamp cage 226 fixed to the support body 220. The clamp connector 224 further includes a shiftable pad 228. The pad 228 is rotatably mounted on a threaded fastener 230. The fastener 230 is threadably supported by the support body 220 and is rotatable to move the pad 228 toward and away from the clamp cage 226. The cage 226 and pad 228 cooperatively form an opening 232 that is adjustably sized and removably receives a tool, such as the brush B. The clamp connector 224 is configured to be shifted into and out of removable frictional engagement with the brush B.

Each connector 222,224 and the corresponding tool are preferably configured to provide the sole connection between the tool holder 200 and the corresponding tool.

Turning to FIGS. 30-33, an alternative tool holder 300 is constructed in accordance with a third embodiment of the present invention. The description of the alternative tool holder 300 will focus primarily on the differences of this alternative embodiment from the second preferred embodiment described above.

The tool holder 300 preferably includes an alternative tool support 302 and proximal body 303. The proximal body 303 includes a telescopic extension pole 304 and a proximal housing 306.

The proximal housing 306 is preferably attached to the extension pole and is adjustably attached to the tool support 302. The proximal housing 306 preferably includes a yoke 308, a pin 310, and a lever 312. The yoke 308 has a unitary construction and includes opposite yoke arms 314 that pivotally receive the tool support 302.

The tool support 302 is configured for interchangeable use with a variety of tools provided with different connection elements. Preferably, the tool support 302 includes a distal support body 316, a threaded connector 318, and an alternative clamp connector 320.

The pin 310 extends through the support body 316 and the yoke arms 314 so that the support body 316 is pivotally mounted to the yoke 308. The lever 312 is attached to one end of the pin 310 and is shiftable into a locking position (see FIGS. 30-33). In the locking position, the pin 310 and lever 312 cooperatively shift the yoke arms 314 into frictional engagement with the support body 316 to restrict rotation of the support body 316 relative to the yoke 308. The unsupported end of the lever 312 is pivotal away from the yoke 308 (and out of the locking position). With the lever 312 out of the locking position, the pin 310 and lever 312 permit the yoke arms 314 to move away from each other and out of frictional engagement with the support body 316. As a result, the support body 316 can freely rotate relative to the yoke 308.

The distal support body 316 is configured to support the connectors 318,320 so that the connectors 318,320 are swingable together with the support body 316. The connectors 318,320 are also preferably swingable relative to the yoke 308 and the extension pole 304. In this manner, the connectors 318,320 can be alternatively located distally to facilitate connection to a connection element of a respective tool.

The clamp connector 320 includes an elongated clamp body with opposite sides 322 (see FIG. 32). The clamp connector 320 also includes an adjustable strap 324 that cooperates with the clamp body to define an opening 326 (see FIG. 32). One end of the strap 324 is pivotally attached to an unsupported end of one of the sides 322. Another part of the strap 324 is adjustably secured to a buckle 328. The buckle 328 is attached to an unsupported end of the other one of the sides 322. The buckle 328 is operable to secure the strap 324 in a variety of positions. As a result, the strap 324 can be adjusted to change the size of the opening 326. By adjustment of the strap 324, the clamp connector 320 is configured to be shifted into and out of removable frictional engagement with the brush B.

The sides 322 of the clamp body are pivotally mounted to the yoke 308 by the pin 310. In the locking position, the clamp connector 320 is restricted from pivoting relative to the yoke 308. With the lever 312 moved out of the locking position, the clamp connector 32 can freely pivot relative to the yoke 308.

Each connector 318,320 and the corresponding tool are preferably configured to provide the sole connection between the tool holder 300 and the corresponding tool.

Turning to FIGS. 34-41, an alternative tool holder 400 is constructed in accordance with a fourth embodiment of the present invention. The description of the alternative tool holder 400 will focus primarily on the differences of this alternative embodiment from the first preferred embodiment described above.

The tool holder 400 preferably includes an alternative tool support 402 and proximal body 403. The proximal body 403 includes a telescopic extension pole 404 and a proximal housing 406.

The proximal housing 406 is preferably attached to the extension pole 404 and is adjustably attached to the tool support 402. The proximal housing 406 preferably includes a tubular body 408 and a pivotal catch 410 (see FIGS. 34 and 35). The body 408 has a unitary construction and presents a slotted opening 412 that slidably receives the tool support 402 and permits the tool support 402 to pivot relative to the body 408 (see FIG. 41). The proximal housing 406 further includes a pin 413 fixed within the body 408 (see FIG. 37).

The catch 410 is unitary and includes a pawl (not shown) to engage corresponding slots 414a,b on the tool support 402 (see FIGS. 36 and 37). The catch 410 is pivotally mounted on the body 408. The catch 410 is pivotal about a lateral axis into and out of a locking position (see FIGS. 34, 36, and 41) where the pawl engages one of the slots 414. The proximal housing also includes a spring (not shown) operably mounted within the body 408 to urge the catch 410 into the locking position.

The tool support 402 is configured for interchangeable use with a variety of tools provided with different connection elements. Preferably, the tool support 402 includes a distal support body 416, a threaded connector 418, and a clamp connector 420.

Turning to FIGS. 34-37 and 39, the distal support body 416 is configured to support the connectors 418,420 so that the connectors are swingable together with the support body 416. The connectors 418,420 are also preferably swingable relative to the proximal housing 406 and the extension pole 404. Furthermore, the support body 416 permits the connectors 418,420 to be alternatively located distally to facilitate connection to a connection element of a respective tool. That is to say, in this embodiment (similar to the first embodiment), the connectors 418,420 are also shiftable relative to one another.

The support body 416 preferably includes a slotted proximal section 422 and a distal section 424 fixed to one another (see FIGS. 36 and 37). The support body 416 also includes a laterally shiftable keeper 426 mounted in the distal section 424.

The distal section 424 presents a bore 428 that extends axially through the distal section 424 (see FIG. 39). The bore 428 is configured to slidably receive the threaded connector 418.

The proximal section 422 comprises a slotted body that presents an axial slot 430 and the slots 414a,b (see FIGS. 36 and 37). The proximal section 422 is slidably mounted on the pin 413 and at least partly slidably received by the body 408 to form a connection joint 434 (see FIGS. 37 and 41).

The connection joint 434 preferably permits the support body 416 and the proximal housing 406 to slide axially relative to one another between a retracted body condition (see FIGS. 34 and 35) and an extended body condition (see FIGS. 36 and 37). In the retracted body condition, the pawl of the catch 410 is urged into engagement with the slot 414a (corresponding to the locking position) to restrict relative axial sliding movement between the support body 416 and the proximal housing 406. The catch 410 can also be shifted out of the locking position so that the pawl is disengaged and permits relative axial sliding movement between the support body 416 and the proximal housing 406 into and out of the retracted body condition.

In the extended body condition, the pawl of the catch 410 is urged into engagement with one of the slots 414b (corresponding to the locking position) to restrict relative axial sliding movement between the support body 416 and the proximal housing 406. The catch 410 can also be shifted out of the locking position so that the pawl is disengaged and permits relative axial sliding movement between the support body 416 and the proximal housing 406 into and out of the extended body condition.

Also in the extended body condition, the connection joint 434 also preferably permits the support body 416 to pivot about the pin 413 (see FIG. 41). In the illustrated embodiment, pivoting of the support body 416 is substantially restricted to the extended body condition. In particular, if the support body 416 is moved proximally out of the extended body condition, the proximal section 422 is slidably received in the proximal housing 406 such that the proximal housing 406 and proximal section 422 cooperatively restrict relative pivotal movement therebetween about the pin 413. The pinned connection of the proximal section 422 to the proximal housing 406 also restricts relative rotation between the support body 416 and the proximal housing 406 about a housing axis H (see FIG. 36).

Still referring to the extended body condition, the support body 416 is swingable about the pin 413 among a range of positions relative to the proximal housing 406. The slots 414b, which can each be engaged by the pawl of the catch 410, enable the support body 416 to be secured is a series of discrete pivotal orientations.

Although the support body 416 preferably includes the axially slotted body, the tool holder could be alternatively configured so that the proximal body 403 includes an axially slotted body. In such an alternative embodiment, the slotted body could be pinned to the support body and slidably received in a bore presented by the support body.

Turning to FIGS. 34, 35, and 39, the clamp connector 420 preferably includes a unitary collet 436 fixed to the support body 416. The clamp connector 420 also includes a rotatable collar 438. The collet 436 includes a pair of opposed jaws 440 and a threaded base 442, with the bore 428 extending through the collet 436 (see FIG. 39). The collet 436 is preferably configured to flex so that the jaws 440 are shiftable toward and away from each other. As discussed below, the collar 438 is operable to engage and urge the jaws 440 toward each other.

The threaded connector 418 is preferably axially slidable within the bore 428 between a retracted position (see FIG. 40) and an extended position (see FIGS. 34 and 35). A spring 443 is also located within the bore 428 and is configured to urge the threaded connector 418 distally toward the extended position (see FIG. 39). As the threaded connector 418 is advanced proximally within the bore 428, the spring 443 applies a progressively increasing force that urges the threaded connector distally.

The threaded connector 418 is preferably slidable so that the connectors 418,420 are shiftable relative to one another along the axis of the bore 428. The connectors 418,420 are preferably shiftable relative to one another so as to be alternatively located distally. Each connector 418,420 is positionable at least in part distally of the other connector 418,420 to facilitate connection to the connection element of the respective tool.

In the illustrated embodiment, the keeper 426 is configured to removably engage the threaded connector 418 in the retracted position. While the threaded connector 418 is retracted, the keeper 426 can be depressed by a user to disengage the keeper 426 from the threaded connector 418. With the keeper 426 disengaged, the spring 443 urges the threaded connector 418 distally out of the retracted position.

The collar 438 comprises a unitary threaded sleeve with an internal threaded surface 444 (see FIG. 39). The collar 438 also preferably presents a distal end with a proximally tapering interior surface 446 (see FIG. 39).

The collar 438 is threadably received on the threaded base 442. The collar 438 is operable to be threaded so that the distal end can be moved into and out of engagement with tapered side surfaces 448 of the jaws 440 (see FIGS. 34, 35, and 39). As the collar 438 is progressively distally advanced in engagement with the jaws 440, the surfaces 446,448 slidably engage one another so that the jaws 440 are progressively shifted toward one another. In this manner, the jaws 440 can be urged into frictional engagement with the threaded connector 418 (see FIG. 39) or the brush B (see FIG. 40).

Turning to FIGS. 42-45, an alternative tool holder 500 is constructed in accordance with a fifth embodiment of the present invention. The description of the alternative tool holder 500 will focus primarily on the differences of this alternative embodiment from the fourth preferred embodiment described above.

The tool holder 400 preferably includes an alternative tool support 502 and proximal body 503. The proximal body 503 includes a telescopic extension pole 504 and a proximal housing 506.

The proximal housing 506 is preferably attached to the extension pole 504 and is adjustably attached to the tool support 502. The proximal housing 506 preferably includes a tubular body 508 and a pivotal catch 510 (see FIGS. 43 and 45). The body 508 has a unitary construction and presents a slotted opening 512 that slidably receives the tool support 502 and permits the tool support 502 to pivot relative to the body 508 (see FIG. 44). The proximal housing 506 further includes a pin (not shown) fixed within the body 508. The catch 510 is unitary and includes a pawl (not shown) to engage corresponding slots 514 (see FIG. 45) on the tool support 502.

The tool support 502 is configured for interchangeable use with a variety of tools provided with different connection elements. Preferably, the tool support 502 includes a distal support body 516, a threaded connector 518, and a clamp connector 520.

The distal support body 516 is configured to support the connectors 518,520 so that the connectors are swingable together with the support body 516. The connectors 518,520 are also preferably swingable relative to the proximal housing 506 and the extension pole 504. Furthermore, the support body 516 permits the connectors 518,520 to be alternatively located distally to facilitate connection to a connection element of a respective tool. That is to say, in this embodiment (similar to the first embodiment), the connectors 518,520 are also shiftable relative to one another.

The support body 516 preferably includes a slotted proximal section 522 and a distal section 524, with the sections 522,524 being fixed to one another (see FIGS. 44 and 45). A bore 528 extends axially through the distal section 524 (see FIGS. 42 and 43). The bore 528 is configured to slidably receive the threaded connector 518.

The proximal section 522 comprises a slotted body that presents an axial slot 530 (see FIGS. 44 and 45). The proximal section 522 also presents slots 514 (see FIG. 45). Although most of the slots 514 are not depicted, the slots 514 are substantially the same in number and in location on the proximal section 522 compared to the slots 414 in the previous embodiment. The proximal section 522 is slidably mounted on the pin and at least partly slidably received by the body 508 to form a connection joint 534 (see FIGS. 44 and 45) similar to the connection joint 434.

The clamp connector 520 preferably includes a unitary collet 536 fixed to the support body 516. The clamp connector 520 also includes a shiftable latch device 538. The collet 536 includes a pair of opposed jaws 540*a,b*, with the bore 528 extending through the collet 436 (see FIG. 42). The collet 536 is preferably configured to flex so that the jaws 540*a,b* are shiftable toward and away from each other.

The threaded connector 518 is preferably axially slidable within the bore 528 between a retracted position (see FIGS. 44 and 45) and an extended position (see FIGS. 42 and 43).

A spring 542 is also located within the bore 528 and is configured to urge the threaded connector 518 distally toward the extended position.

The threaded connector 518 is preferably slidable so that the connectors 518,520 are shiftable relative to one another along the axis of the bore 528. The connectors 518,520 are preferably shiftable relative to one another so as to be alternatively located distally. Each connector 518,520 is positionable at least in part distally of the other connector 518,520 to facilitate connection to the connection element of the respective tool.

The latch device 538 preferably includes a lever 544 pivotally mounted to lugs 546, which are fixed to the jaw 540*a*. The lever 544 and lugs 546 are pivotally attached by a pin 548 that permits rotating movement therebetween about a lateral axis.

The latch device 538 also preferably includes a unitary wire loop 550 swingably attached to the lever 544 at a location spaced from the pin 548. The wire loop 550 is operable to be removably engaged with one of a series of notches 552 presented by the jaw 540*b* (see FIG. 42).

The latch device 538 can be moved between a locked condition (see FIGS. 42, 44, and 45) and an unlocked condition (see FIG. 43). In the locked condition, the latch device 538 urges the jaws 540*a,b* toward each other and into frictional engagement with the threaded connector 518 (see FIG. 42) or the brush B (see FIGS. 44 and 45). In the unlocked condition, the latch device 538 is disengaged from the jaw 540*b* so that the collet 536 permits the threaded connector 518 or brush B to slide through the bore 528.

The latch device 538 can be moved from the unlocked condition to the locked condition by locating the lever 544 in a distal position (see FIG. 43). If necessary, the wire loop 550 can be rotated proximally or distally relative to the collet 536 to position the wire loop 550 adjacent one of the notches 552. The lever 544 can then be swung proximally to a proximal position (see FIG. 42) so that the wire loop 550 is moved into engagement with the corresponding notch 552.

To unlock the latch device 538, the lever is swung distally to the distal position so that the wire loop 550 out of the engagement with the corresponding notch 552. The wire loop 550 can then be swung freely relative to the collet 536.

The latch device 538 and collet 536 are preferably configured so that the lever 544 is in an over-center condition when the latch device 538 is in the locked condition. That is, in the locked condition, the lever 544 and wire loop 550 cooperatively restrict distal swinging of the lever 544.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. An adjustable tool holder for interchangeable use with a variety of tools provided with different connection elements, including at least a first connection element configured for a first manner of connection with the tool holder and a second connection element configured for a second manner of connection with the tool holder, said tool holder comprising:
   a proximal body; and
   a distally extending tool support coupled to the proximal body and operable to detachably support each of the tools,
   said tool support including a first tool connector, a second tool connector, and a support body,
   said support body presenting a longitudinal axis and operably supporting each of the tool connectors for connection to the respective connection element,
   said first tool connector defining a first interconnection location, at which the first tool connector is configured to engage and thereby releasably connect with the first connection element in the first manner of connection,
   said second tool connector defining a second interconnection location, at which the second tool connector is configured to engage and thereby releasably connect with the second connection element in the second manner of connection,
   said tool connectors being shiftable relative to one another so as to be alternatively located distally to facilitate connection to the respective connection element, while the tool support remains coupled to the proximal body,
   said first tool connector being slidable relative to the support body between a proximal position, in which the first interconnection location is closer to the proximal body than the second interconnection location, and a distal position, in which the first interconnection location is farther from the proximal body than the second interconnection location.

2. The adjustable tool holder as claimed in claim 1,
   one of said tool connectors presenting a bore extending along a bore axis, with the other tool connector configured to be slidably received within the bore and the tool connectors slidable relative to one another along the bore axis.

3. The adjustable tool holder as claimed in claim 2,
   said first tool connector presenting the bore, with the second tool connector configured to be slidably received within the bore.

4. The adjustable tool holder as claimed in claim 3,
   said first tool connector receiving and at least partly covering the second tool connector, when the first tool connector is in the distal position, to thereby restrict access to the second tool connector by the second connection element.

5. The adjustable tool holder as claimed in claim 3,
   said first tool connector including relatively shiftable clamping components such that the first manner of connection involves releasable frictional interconnection between the first tool connector and first connection element,
   said second tool connector including threading such that the second manner of connection involves threadably interconnecting the second tool connector and second connection element.

6. The adjustable tool holder as claimed in claim 2,
   said first tool connector including relatively shiftable clamping components such that the first manner of connection involves releasable frictional interconnection between the first tool connector and first connection element,
   said second tool connector including threading such that the second manner of connection involves threadably interconnecting the second tool connector and second connection element.

7. The adjustable tool holder as claimed in claim 2,
   said first tool connector being positioned on the support body when the first tool connector is in the distal position,
   said first tool connector being positioned at least partly off the support body when the first tool connector is in the proximal position.

8. The adjustable tool holder as claimed in claim 7, further comprising:
   said proximal body presenting a distal end, with the support body extending distally relative to the proximal body,
   said first tool connector being positioned on the proximal body when the first tool connector is in the proximal position.

9. The adjustable tool holder as claimed in claim 8,
   said support body being pivotally coupled to the proximal body,
   said support body being pivotal relative to the first tool connector when the first tool connector is in the proximal position,
   said support body and said first tool connector being pivotal together relative to the proximal body when the first tool connector is in the distal position.

10. The adjustable tool holder as claimed in claim 2,
    said second tool connector presenting the bore, with the first tool connector configured to be slidably received within the bore.

11. The adjustable tool holder as claimed in claim 10,
    said second tool connector receiving and at least partly covering the first tool connector, when the first tool connector is in the proximal position, to thereby restrict access to the first tool connector by the first connection element.

12. The adjustable tool holder as claimed in claim 10,
    said second tool connector including relatively shiftable clamping components such that the second manner of connection involves releasable frictional interconnection between the second tool connector and second connection element,
    said first tool connector including threading such that the first manner of connection involves threadably interconnecting the first tool connector and first connection element.

13. The adjustable tool holder as claimed in claim 12,
    said second tool connector including a collet,
    said collet including relatively shiftable opposed jaws that define the clamping components,
    said bore extending through the collet, with the jaws operable to be urged toward each other in frictional engagement with the second connection element.

14. The adjustable tool holder as claimed in claim 13,
    said jaws frictionally engaging the first tool connector when the first tool connector is in the distal position.

15. The adjustable tool holder as claimed in claim 13,
said second tool connector including a tubular collar threadably received on the collet and threadable into engagement with the jaws to urge the jaws toward one another.

16. The adjustable tool holder as claimed in claim 13,
said second tool connector including a latch device pivotally mounted on one of the jaws,
said latch device operable to be removably engaged with the other one of the jaws to urge the jaws toward one another.

17. The adjustable tool holder as claimed in claim 10,
said support body being pivotally coupled to the proximal body,
said support body and said first and second tool connectors being pivotal together relative to proximal body.

18. The adjustable tool holder as claimed in claim 1,
said proximal body including an elongated grasping handle presenting a distal end,
said tool support being coupled to the elongated grasping handle adjacent the distal end.

19. The adjustable tool holder as claimed in claim 18,
said grasping handle including a pair of telescopically interfitted pole sections.

20. The adjustable tool holder as claimed in claim 1,
said tool support being pivotally coupled to the proximal body.

21. The adjustable tool holder as claimed in claim 1,
said second tool connector being at least in part rotatably attached relative to the support body and rotatable about an axis.

\* \* \* \* \*